(12) United States Patent
Henkel

(10) Patent No.: US 7,453,036 B1
(45) Date of Patent: Nov. 18, 2008

(54) SYSTEM AND METHOD FOR TEACHING PIANO

(76) Inventor: Beverly Henkel, 4409 Hilltop Dr., Lynchburg, VA (US) 24502-1211

( * ) Notice: Subject to any disclaimer, the term of this patent is extended or adjusted under 35 U.S.C. 154(b) by 0 days.

(21) Appl. No.: 11/758,133

(22) Filed: Jun. 5, 2007

(51) Int. Cl.
G09B 15/02 (2006.01)

(52) U.S. Cl. .................... 84/483.2; 84/470 R

(58) Field of Classification Search ........... 84/483.2, 84/470 R, 478
See application file for complete search history.

(56) References Cited

U.S. PATENT DOCUMENTS

| | | | |
|---|---|---|---|
| 4,361,070 A * | 11/1982 | Huiner | 84/478 |
| 5,685,724 A | 11/1997 | Bubar | |
| 6,015,947 A | 1/2000 | Moberg | |
| 6,388,182 B1 | 5/2002 | Bermudez | |
| 6,881,883 B2 | 4/2005 | Harrison | |
| 6,967,274 B2 | 11/2005 | Hanington | |
| 7,148,414 B2 * | 12/2006 | Kestenbaum et al. | 84/483.2 |
| 7,174,510 B2 | 2/2007 | Salter | |
| 7,388,143 B1 * | 6/2008 | Maiani | 84/470 R |
| 2006/0011044 A1 * | 1/2006 | Chew | 84/609 |
| 2007/0044638 A1 * | 3/2007 | Egan | 84/483.2 |

OTHER PUBLICATIONS

Alexander, et al., Alfred's Premier Piano Course, 2005, p. 2, Alfred Publishing Co., Inc., USA.

* cited by examiner

Primary Examiner—Walter Benson
Assistant Examiner—Jianchun Qin
(74) Attorney, Agent, or Firm—Woods Rogers PLC; Peter E. Rosden

(57) ABSTRACT

A method for teaching reading of musical notes and playing the piano by introducing notes/keys in alphabetically sequential groups starting at the beginning of the musical alphabet with "A" in the middle set of seven alphabetical notes on the Grand Staff and middle set of keys on the keyboard and proceeding to a higher set of seven alphabetical notes/keys and then a lower set of seven alphabetical notes/keys. A separate page is devoted to each note along with an explanation of where the note appears on a musical clef. Notes are learned alphabetically in groups of seven alphabetically-sequential notes/keys rather than simply by finger position/patterns. Students are taught to play either clef (bass and treble) with either hand using musical pieces specifically designed to teach each note individually and in combination as it is added to the student's repertoire.

8 Claims, 30 Drawing Sheets

Quar-ter note, tap each note one count
FIG 4
Half note, two counts   Half note, two counts
Quar-ter, Half note, One, one, two counts, Quar-ter, Half note, One, one, two counts
Quar-ter, one, one, Half note, two counts, Quar-ter, one, one, Half note, two counts
   
Wholenote four counts, 1  2  3  4   Wholenote four counts, 1  2  3  4

A Sunday Afternoon Stroll

My A page

A is the note on the top line (5th line) of the Bass Clef.

Please draw several neat whole notes

Please draw several neat half notes

Please draw several neat quarter notes

1. Name the notes with letter names
2. Tell how many counts each note receives

Write several A's and B's

Write several A's and C's

Write several A's and B's and C's

```
   2   +   2   +   2
 ┌───┬───┬───┬───┬───┬───┐
 │   │   │   │   │   │   │  = 6
 ├───┴───┼───┴───┼───┴───┤
 │       │       │       │  = 6
 └───────┴───────┴───────┘
     3       +       3
```

```
   1 + 1 + 1
 ┌───┬───┬───┐
 │   │   │   │  = 3
 ├───┼───┼───┤
 │   │   │   │  = 3
 └───┴───┴───┘
 1 + 1/2+1/2 + 1
```

```
 1/3+1/3+1/3
 ┌───┬───┬───┐
 │   │   │   │ = 1
 ├───┴───┼───┤
 │       │   │ = 1
 └───────┴───┘
   1/2 + 1/2
```

Now try this:

1   2   3   4

2   +   2

1   2   3   4

An eighth note receives 1/2 count.
eighth-note-half-count,eighth-note-half-count
Eight eighth notes equal 4 counts.

A sixteenth note receives 1/4 count.

quick- teenth each fourth quick- teenth each fourth, 'six-' 'notes,' 'one- count 'six-' 'notes,' 'one- count Sixteen sixteenth notes equal 4 counts.

Ratios of 2:1

\*\*\*\*\*\*\*\*\*\*\*\*\*\*\*\*\*\*\*
\*\*\*\*\*\*\*\*\*\*\*\*\*\*\*\*\*\*\*    40:20    \*\*\*\*\*\*\*\*\*\*\*\*\*\*\*\*\*\*

10:5

8:4

( 𝒐 = 4 counts)    4:2    ( 𝅗𝅥 = 2 counts)

( 𝅗𝅥 = 2 counts)    2:1    ( ♩ = 1 count)

( ♩ = 1 count)    1:1/2    ( ♪ = 1/2 count)

( ♪ = 1/2 count)    1/2:1/4    ( ♪ = 1/4 count)

Therefore,

○. = 6 counts, 𝅗𝅥. = 3 counts, ♩. = 1 1/2 counts, ♪. = 3/4 count

SYSTEM AND METHOD FOR TEACHING PIANO

TECHNICAL FIELD

The subject invention relates generally to a simple, effective method for teaching students of all ages how to play the piano. More particularly, this invention provides students with a method for learning to read musical notes in combination with understanding musical rhythm.

BACKGROUND OF THE INVENTION

Piano methods published during the last fifty to one hundred years have generally presented middle C as the first note that students read. Students then usually have learned the so-called "C position" for their fingers. In the majority of such methods students spend a considerable amount of their practice time on pieces in the C position, especially with the right hand (even if the method claims not to use positions). This means that students often learn false concepts, the first of which being that the right hand thumb's "job" on the keyboard is to play middle C, the second (index) finger plays D, the third finger plays E, the fourth (ring) finger plays F, and the fifth (smallest) finger plays G. Many students often don't actually "read" these notes after the first few lessons, but simply push down the finger that is suggested by the note on the staff—so that the note becomes a stimulus for a specific finger to play apart from any thought regarding the letter name of the note or the location of the hand on the keyboard. These associations often remain with the student long after they are no longer playing the easy beginner pieces and inhibit their ability to read since these note-finger associations are somehow more or less permanently fixed in their mind/finger responses to the notes they are seeing. Thus a student who has made these associations will see a D (which some students can no longer confidently name as a D) on a more advanced piece and will inadvertently press the second finger down even when it is not near the D key (perhaps the musical situation would naturally and appropriately lead the fourth finger to play the D). These prior learning methods therefore inadvertently foster playing mistakes for many students.

Also, learning the C position, particularly if the left hand thumb shares the Middle C with the right hand thumb (as in many beginner materials), causes students to falsely conceptualize a vertical mirror arrangement so that the D at the bottom of the Treble Clef will be learned and then the B at the top of the Bass Clef will also be read as D; next, the E on the lowest line of the Treble Clef will also be named when in fact the note is A on the top line of the Bass Clef, etc. This vertical mirror association may relate to the mirrored relationship of the hands/fingers. In addition, since in these older methods students are presented with either positions (usually C, D, E, F G and later G, A, B, C, D), isolated notes, or fragmented positions as in some more recent methods—groups of random notes—say two for the left hand (G and A, for instance) and three for the right hand (D, E, F, for example), the simple and logical alphabetical order of the keys on the keyboard and notes on the staff is not well understood often for years.

Another problem relates to the way rhythm is taught. Rhythm is often presented using counting symbols ("1, 2, 3, 4," and later "1 and 2 and 3 and 4 and") associated with appropriate note values; some systems present words ("piccadilly circus," for instance, again associated with specific note values) which students are taught to recite rhythmically. Counting symbols are not well explained. Recently, some methods have spaced notes closer together or farther apart according to their relative values in learning pieces. No other type of information is offered to help students conceptualize the proportional divisions of time indicated by the various note values.

Few if any attempts have been made to address these problems effectively because until now these problems have not been precisely identified, understood, or defined. Publishers of piano methods simply are blind to the problems they have been creating for many students for the last century. With regard to rhythm, methods of the prior art typically introduce one type of note, such as a quarter note, with an explanation such as "Count: 1 1 1 1" followed by various numbers of other notes each having the same duration (usually half notes). This approach does nothing to teach rhythm (which results from the juxtaposition of notes having longer and shorter duration). Rhythmic practice is best taught from the first rhythmic exercise by integration at that point of notes having different durations. Furthermore, the use of visual/proportional representations and verbal recitations of measured instructive phrases to facilitate rhythmic conceptualization does not appear to have been included in other known piano instruction methods. Nor do clear explanations of counting symbols appear to have been included in piano methods of the prior art. With regard to pulse, merely reciting 1 2 3 4 or 1 2 3 as done in methods of the prior art is helpful but not always reliable since people can say these numbers at an uneven pace. By contrast, executing and practicing conducting patterns repetitively interspersed with reading and playing music establishes a physical and intellectual understanding of steady, even pulse. Thus, the clear teaching of pulse and rhythm would be best accomplished by (1) rhythmic reading with instructional phrases, (2) conducting various meters, (3) studying proportional graphics associated with various note values and combinations, and (4) clarifying the meaning of counting symbols.

Some piano instruction methods claim to disassociate finger positioning from specific notes, but such systems fail in that regard due to their excessive reliance on practice pieces which nevertheless mandate the use of the Middle C position. Moreover, when such methods require different fingering, they do so with completely different pieces instead of teaching students varied fingering is permissible even while playing the same piece. This preponderance of pieces in the Middle C position together with the lack of alphabetical continuity in the way notes are taught places students at a disadvantage in terms of reading and developing confident keyboard and staff orientation Not only does reliance on the "C" orientation create encumbrances to note-reading development as well as false note/finger associations, the error is often compounded by jumping the student to a "G" position in which students often feel totally confused as the same fingers must now play these new and unfamiliar notes/keys. This disadvantage could be eliminated by teaching students from the beginning (1) to recite and identify as they play all white keys on the piano keyboard in order to establish a clear understanding of the simple repetition of the alphabetical order and arrangement of keys on the entire keyboard so the keyboard is accessible from the beginning rather than seeming an intimidating and obscure mélange of several dozen unknown keys, this being done prior to learning to read notes on the musical staff; (2) to write a few notes from the middle set of seven alphabetical notes before playing them in a piece; and (3) to continue to write and associate individual notes with keys in progressive alphabetical order in the first middle set of seven keys continuing from this to learn notes and keys according to alphabetical sets of seven white keys as they appear on the keyboard both to the right and left of this middle set.

SUMMARY OF THE INVENTION

The present invention relates to a method for teaching students how to play the piano by presenting a new method for learning notes in combination with rhythm. After performing preparatory activities, being introduced to rhythm and pulse and playing notes for the first time, students are introduced individually and alphabetically to a first middle set of notes and keys extending from A to G and including middle C, then a second higher set of notes and keys adjacent to and higher than the first middle set and also extending from A to G and finally to a third lower set of notes and keys adjacent to and lower than the first middle set but introduced in reverse alphabetical order from G to A. Students learn to identify both keys and notes before playing them and are also taught progressively complex rhythmic concepts. The invention relates further to a method of teaching students how to play the piano in which students learn keys on the keyboard using the D key as an orientation checkpoint, notes and keys are taught together in sets of seven in alphabetical order on a Grand Staff so that any key or note can be identified by the student with either finger of either hand, the student learns to write each note in various durations on the Grand Staff before playing that note, the student learns to recognize the duration of notes which are going to be played; and the student learns to play notes in a musical piece on the correct keys on the keyboard with correct rhythm.

BRIEF DESCRIPTION OF THE DRAWINGS

The foregoing and other objects, aspects and advantages of the invention will be better understood from the following detailed description of the invention with reference to the drawings, in which

FIG. 4 shows the visual illustration accompanying the introduction of rhythm and pulse called for by the method of this invention.

DETAILED DESCRIPTION OF THE PREFERRED EMBODIMENT

The method of this invention focuses on teaching students to read and play piano music. For a pianist, reading music entails knowing the letter names of the notes of a piece, simultaneously maintaining a steady pulse while reading the rhythm (note durational values) correctly and knowing which keys to play using logical and efficient fingerings. Due to the fact that for many students the confident reading of notes has been compromised by the previously-described problems created by faulty conceptualization of note-reading, learning new pieces becomes a chore of learning the notes for "that" piece and rhythm is often seen as something to "add on" later; steady pulse sometimes is non-existent in the early stages of learning a new piece. In this method, logical and engaging preparation in note reading, rhythmic understanding and practice, as well as keyboard orientation related to a piece always precede the learning of new pieces, so that students can integrate all aspects from the beginning as they "read" these new pieces. The various facets of this method involve confidently knowing which piano key is which, learning and observing meticulously note durational values, understanding and establishing steady pulse, naming notes without hesitation from the Bass or Treble Clef along with keyboard and pitch awareness. For example, when a student sees a half note, the student needs to know what the pulse is in order to know the duration of a two count hold for that note. In addition, the student must know which key on the keyboard that note represents and which finger to use to play that note. Although these facets may be introduced individually or in different combinations and in various orders, successful reading, for purposes of this invention, involves integrating all of these facets simultaneously. Furthermore, learning of rhythmic concepts is facilitated in this method through the use of a combination of graphics, musical notation and integrated textual displays. This approach significantly enhances the ability of students to absorb and retain the meaning of new concepts as they are introduced.

Figure 1:
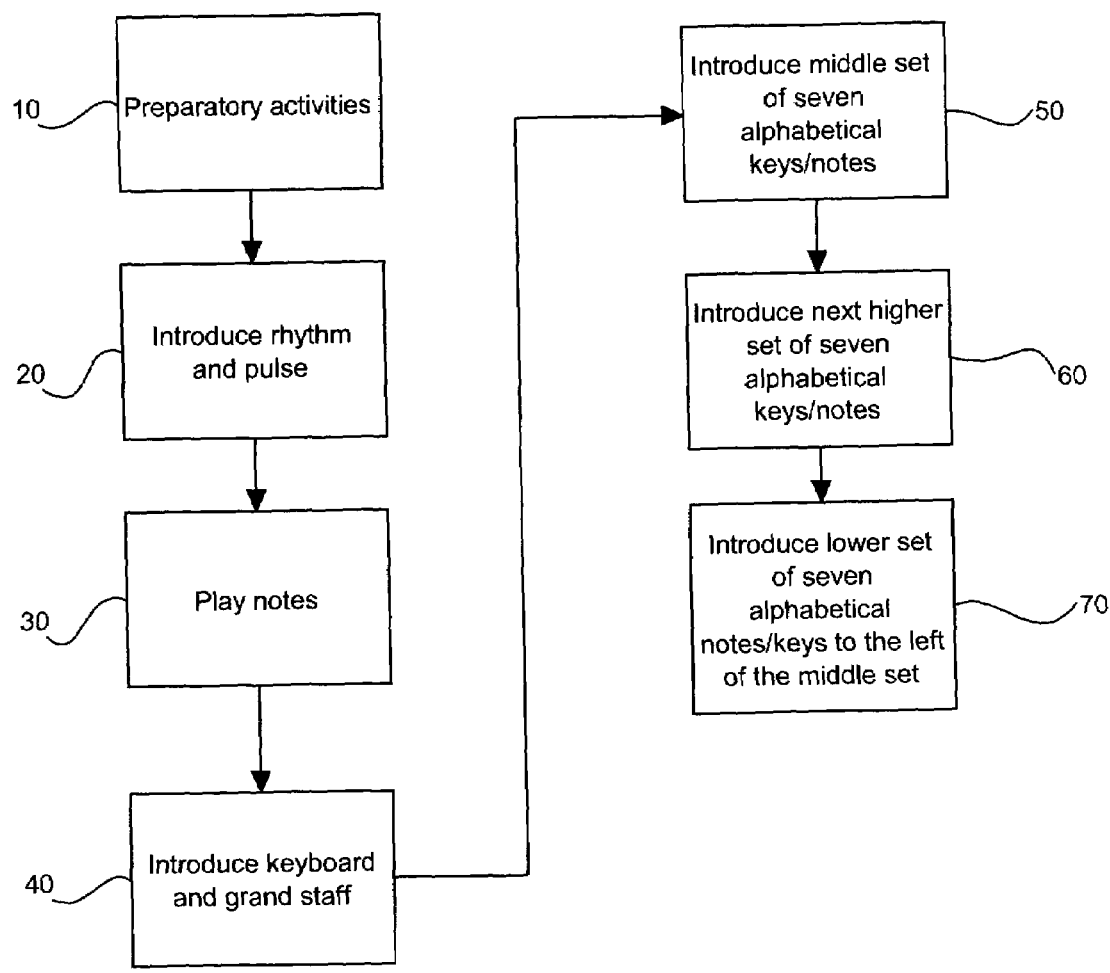
FIG. 1 is an overview in block diagram form of the method of the invention.

FIG. 1 presents an overview of the method of this invention in the form of a flow diagram. At 10, activities preparatory to learning are undertaken. Rhythm and pulse are introduced at 20. At 30, the student plays pieces on the black keys, one with alternating hands and one with hands together that are presented in a non-staff format, yet integrating keyboard orientation concepts, logical fingerings, and steady pulse as well as the combination between the two hands of rhythmic concepts learned thus far. The first association between note names, the keyboard and a Grand Staff occurs at 40. Then, each note and key of the musical alphabet in the middle set of seven notes/keys are introduced in alphabetical order from A to G at 50. Next, the adjacent higher set of seven notes/keys are presented at 60 followed at 70 by the adjacent lower set of seven notes/keys, this time from G to A, just to the left of the middle set. Interspersed with the introduction of new notes are illustrations and explanations of increasingly complex rhythmic concepts, illustrations and explanations of intervals, the introduction of various meters, and illustrations of alternate notations for rhythms.

Figure 2:
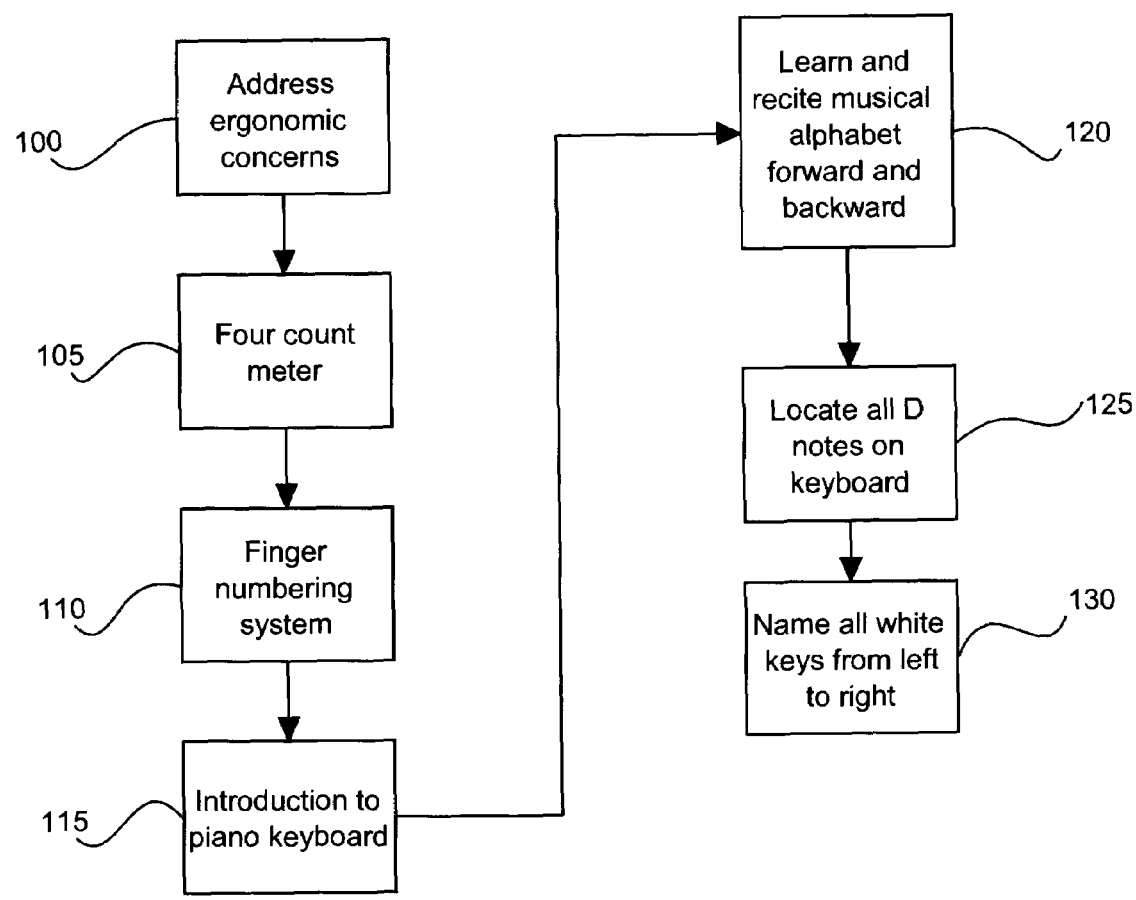
FIG. 2 is a flow chart in block diagram form of preparatory activities called for by the method of this invention.
Figure 3:
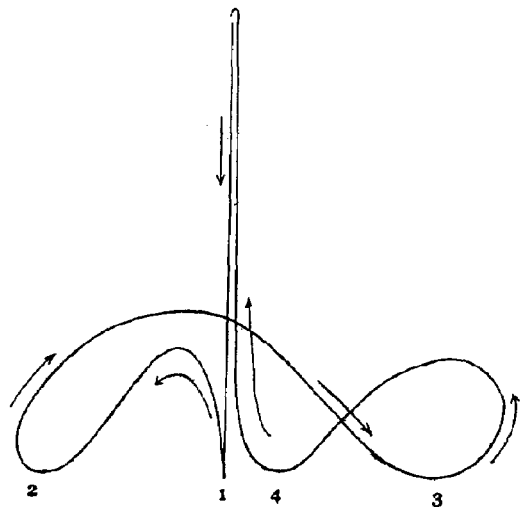
FIG. 3 illustrates the movement of a conductor's baton during a four count meter.

FIG. 2 shows in flow diagram form, the preparatory activities occurring at 10. First, at 100, ergonomic concerns such as proper alignment and body positioning of the student are taught. Then, at 105, students are introduced to a four count meter by means of themselves replicating a specified pattern shown in FIG. 3 with a conductor's baton. Using conductor's motions through repetition helps the student learn pulse. Then, a numbering system for the fingers of each hand is demonstrated at 110 in which the fingers of each hand are assigned a number beginning with one for each thumb and ending at five for each pinkie finger. These numbers will later appear periodically in proximity to musical score notes for the purpose of guiding the student in the development of logical and efficient fingering habits. However, it is important to emphasize that in the method of this system, fingering is flexible and never rigidly tied to specific notes as in many other systems. The student is next oriented to the piano keyboard by being instructed to observe the repetitive alternating pattern of sets of two and three black keys on the piano keyboard at 115. Then, the musical alphabet (A, B, C, D, E, F, G) is recited by the student at 120 both forward and backward. The student must then find all D's on the keyboard at 125. D is the easiest and most "central" key to find since it always resides between a set of two black keys which set is located between two other sets of three black keys and is at the middle of the set of seven keys of the musical alphabet with A B C to the left and E F G to the right. Finally, the student at 130 must name all white keys on the keyboard starting at the leftmost key (an A note) and ending at the rightmost key (a C note). (As discussed at 710 below, the method later calls for naming all keys in reverse order from the rightmost key on the keyboard to the leftmost key on the keyboard). The D key is used as a checkpoint as the student plays and names every white key alphabetically, pausing at each occurrence of a G note. This process provides the student with a degree of confidence regarding his future development in note-reading, movement around the keyboard, and sense of comprehensive keyboard understanding, an awareness that surpasses that usually enjoyed by early-level piano students. Furthermore, by familiarizing students with the entire keyboard early on in their instruction (rather than a few isolated and disjunct sets of five or fewer notes/keys), the students are not left wondering what the rest of the keyboard represents, and they are not later intimidated by moving further out beyond the center of the keyboard.

FIG. 4 illustrates the first introduction of the student to rhythm and pulse together occurring at 20. The student is shown the appearance of quarter, half and whole notes accompanied by a spoken rhythm and pulse identifying each type of note replicating their duration through the speech pattern. The same process is repeated for combinations of these notes. As shown in the illustration, a one count duration of a note is depicted as the word or part of the word underlined a single time while a two count duration includes double underlining (and two spoken words) and a four count duration includes quadruple underlining (and four spoken words). In each case a tapping finger sustains and demonstrates the duration of each of these notes.

Figure 5:
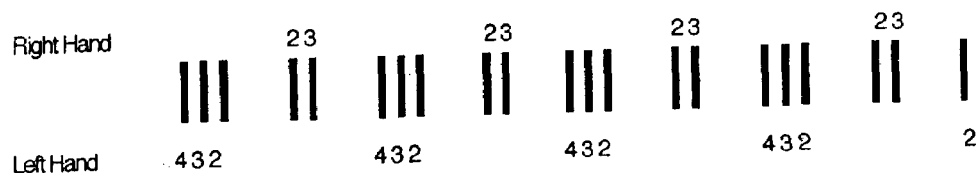
FIG. 5 presents a layout of black keys from a piano keyboard together with right and left hand fingerings to play those keys.
Figure 5:
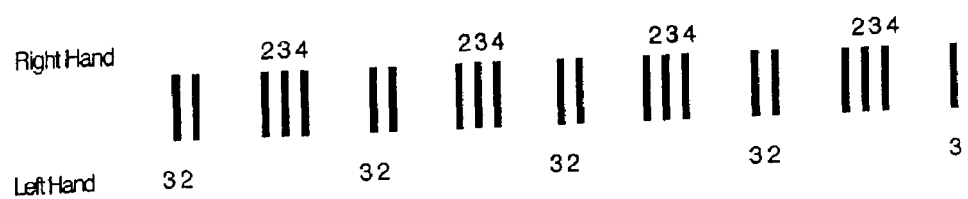
Figure 6:
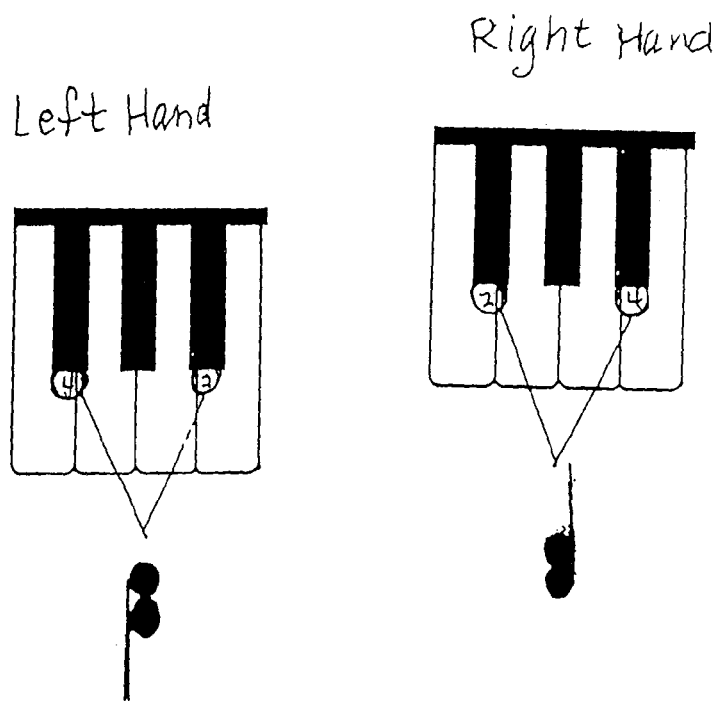
FIG. 6 shows fingering instructions for each hand for playing two-note intervals.
Figure 6:
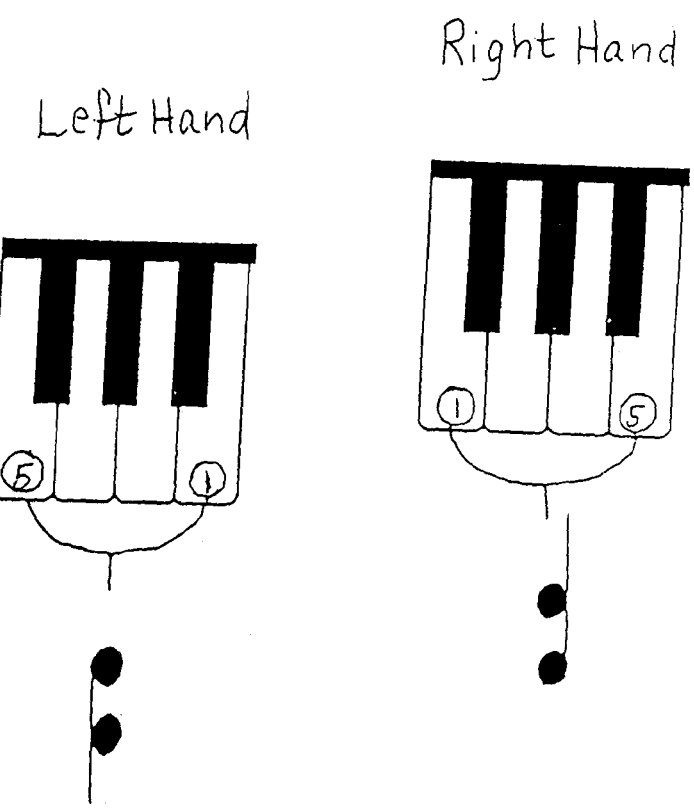
Figure 7:
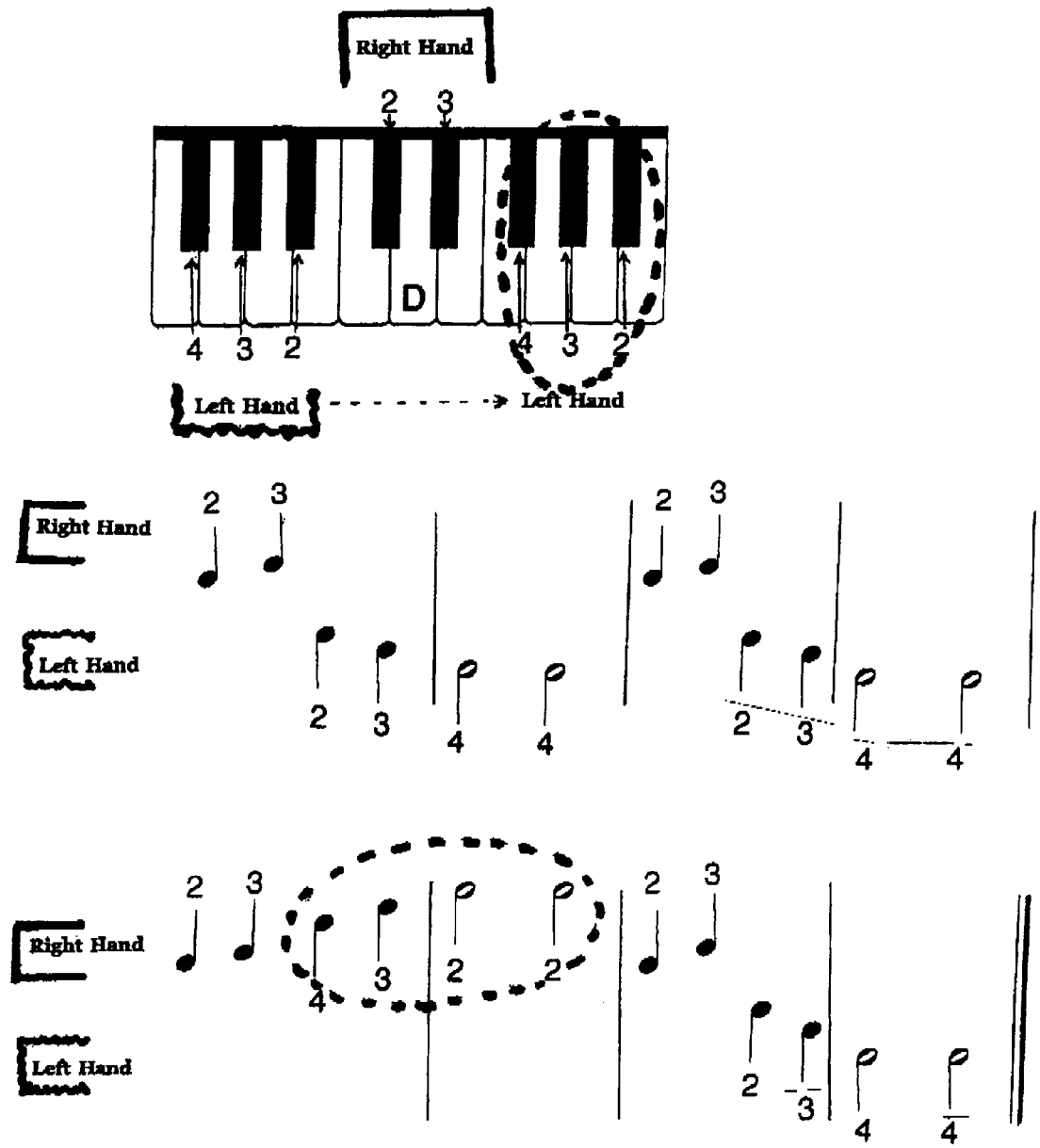
FIG. 7 illustrates a partial keyboard and a non-staff musical piece requiring the left hand to cross over the right hand during playing.
Figure 8:
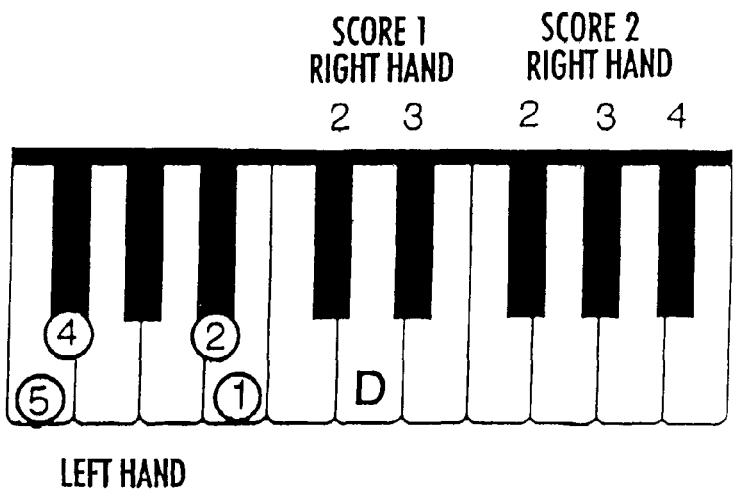
FIG. 8 illustrates a partial keyboard and a non-staff musical piece requiring the left hand to play in one area of the keyboard and the right hand to play in two areas of the keyboard.

FIGS. 5 through 9 depict how the student is instructed at 30 to play notes for the first time. As shown in FIG. 5, playing occurs initially with alternating hands on only the black keys of the keyboard initially starting with the second set of three black keys on the lower left side of the keyboard with the indicated fingers of the designated hand playing the respective keys. Keys are played progressively forward from lower to higher tones and then backward from higher to lower tones. In the next example, the student starts playing the second set of two black keys on the lower left side of the keyboard, and the pattern is repeated. In both cases, play alternates from one hand to the other as specified so that the student experiences hand crossovers. The student is encouraged to play slowly with a steady pulse (which in this case also means a steady rhythm) and to learn to move the arm crossing over or under smoothly and simultaneously while the other hand is playing. Establishing the habit of using designated correct fingerings is also easy to accomplish in this format. In FIG. 6, the student is instructed for the first time to play two black keys simultaneously using the fingering indicated. Pieces for FIG. 7 and FIG. 8 are also non-staff pieces in which the student integrates keyboard orientation concepts, logical fingerings, and steady pulse as well as the combination between the two hands of rhythmic concepts learned thus far. Since the student is not yet reading notes on the Grand Staff, the fingerings still correspond to those learned for other black key pieces. In FIG. 7, part of a piano keyboard is illustrated accompanied by notations indicating suggested fingering for the left hand beneath the keyboard and the right hand above the keyboard. The left hand fingering to the right side of the illustration is surrounded by a dotted line which indicates that these keys are to be played by crossing the left hand over the right hand which remains stationary during the crossover. The non-staff piece displayed below the keyboard is played by the student using the specified fingers of the indicated hand. Where the notes in the piece are surrounded by a dotted line, the indicated notes are to be played by crossing the left hand over the right hand. In order to clarify this process to the student, a coloring scheme is used. Thus, the first group of numbers indicating use of the fingers 2 and 3 of the right hand may be bracketed or highlighted, for example, with the color peach, while the second group of numbers "4 3 2" appearing on the keyboard illustration to the left of the first group are bracketed or highlighted in a different color, for example green, and the third group of numbers marked "4 3 2" appearing to the right of the first group may be bracketed or highlighted with still another color, for example ocean blue. Any set of distinctive colors is acceptable for this purpose so long as the colors are clearly distinguishable from each other. The fingering for the notes in the non-staff piece are similarly marked with color. This color coding scheme facilitates student comprehension of which keys are to be played and how they are to be played. In FIG. 8, again a part of a piano keyboard is illustrated with fingering shown for the right and left hand. In the non-staff piece appearing below the keyboard, the left hand plays in one area of the keyboard playing either the two black keys with fingers 4 and 2 or the two white keys with fingers 5 and 1. By contrast, the right hand plays in two different locations. Once again color coding is used to guide the student. On the first score the right hand plays the two middle black keys and both the 2 3 on the keyboard illustration and the words instructing the student what to do are both bracketed or highlighted in the same color. A different color is then used to bracket or highlight the 2 3 4 above the keyboard illustration and the corresponding instructional words appearing in the non-staff piece.

Figure 9:
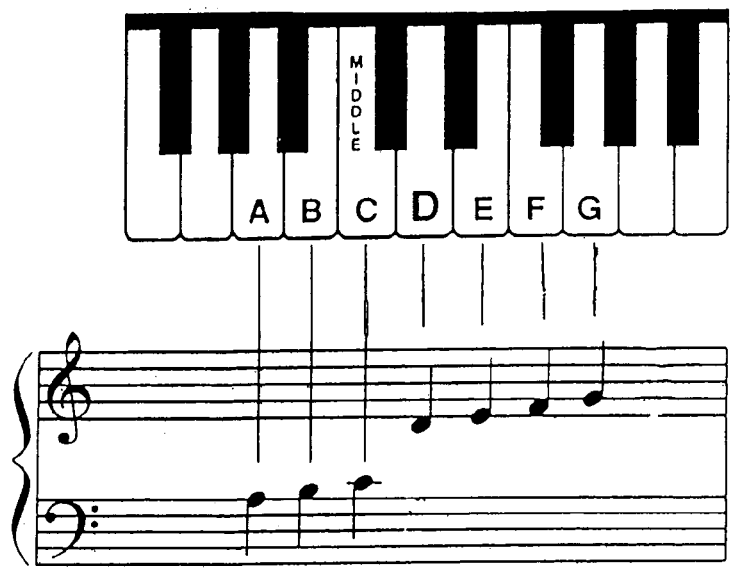
FIG. 9 illustrates the middle set of alphabetical keys and their positions relative to the middle set of seven alphabetical notes on the Grand Staff.

The Grand Staff of 40 is first illustrated in FIG. 9 where a Grand Staff, consisting of a Bass and Treble Clef, is shown with the middle set of seven alphabetical notes (utilizing quarter notes for each note of this set) below an illustration of a middle portion of the keyboard showing the keys related to these seven notes. Starting with the D note, the teacher uses this illustration to drill the student in identifying the note names, respective clef and keyboard positions and associations between keys and notes. The drill involves both speaking and playing the indicated notes.

As described above, each note and key of the middle set of notes and keys of the musical alphabet are individually introduced to the student at 50 in alphabetical sequence from A to G together with progressively more advanced rhythm instruction. This specific process is based on several very logical premises: Using the physically visually/centrally positioned Middle D (being between the two black keys at the center of the keyboard) which is also central to the musical alphabet to foster confident keyboard orientation is very facilitative. The middle set of keys is easily accessible to either hand, and the alphabetical order of notes/keys is easy to understand so students learn quite readily to read and progress from Bass to Treble Clef with either hand (a concept seldom introduced in early beginner methods). In addition, teaching the musical alphabet by mimicking/mirroring the textual alphabet repeats what students have already learned and allows them to integrate and seamlessly transfer familiar concepts to the piano. Initially, the student is introduced to the A note by means of an illustrated note introduction page such as that shown in FIG. 10. Each note is introduced with a description of where it is found on the respective Bass or Treble Clef. The student is then requested to draw several examples of whole, half and quarter note signs representing the note, in this case A, having varying durations on the note introduction page. This same general procedure is followed for each note in alphabetical sequence. The locations for each note are presented to the student along with each new note as described in Table 1:

TABLE 1

| Note | Clef Location Description |
|---|---|
| A | A is the note on the top line (5$^{th}$ line) of the Bass Clef |
| B | B is the note just above the Bass Clef, the space of which touches the top line of the Bass Clef |
| C | C is a note on its own ledger line between the Bass and Treble Clefs |
| D | D is a note at the bottom of the Treble Clef. Its space touches the bottom line of the Treble Clef |
| E | E is a note on the lowest line (1$^{st}$ line) of the Treble Clef |
| F | F is a note inside the lowest space (1$^{st}$ space) of the Treble Clef |
| G | G is a note on the second line of the Treble Clef |

With the introduction of the C note in the middle set, the student also learns that this ledger line below the Treble Clef and above the Bass Clef is actually one and the same line which can be "pulled up or down like an imaginary clothesline" to be conveniently closer to either Treble Clef or Bass Clef depending upon which hand is playing this Middle C note. In either case, the same musical note is being played. Thus, the middle C note marks the transition between the Bass Clef and the Treble Clef.

Figure 13:
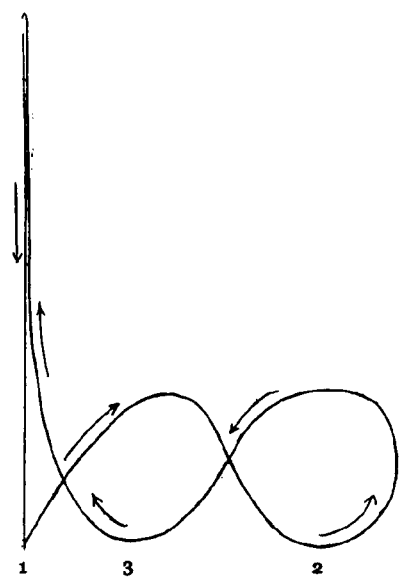
FIG. 13 illustrates the movement of a conductor's baton pattern during a three count meter.
Figure 10:
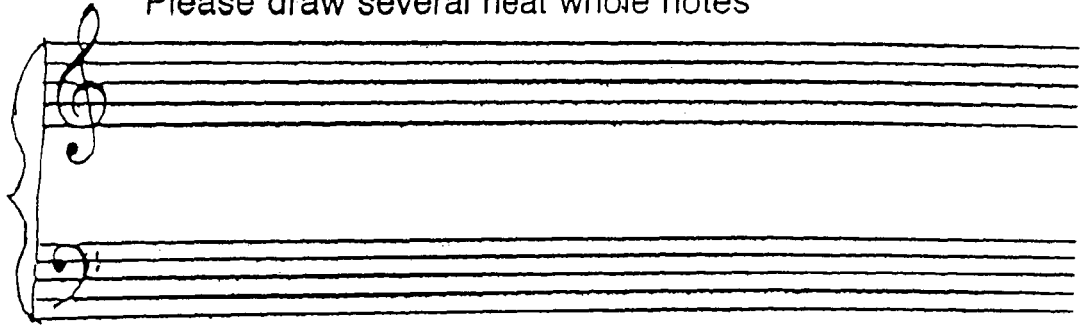
FIG. 10 is an exemplary illustrative page introducing A as the first note of the middle set of alphabetical notes/keys.
Figure 10:
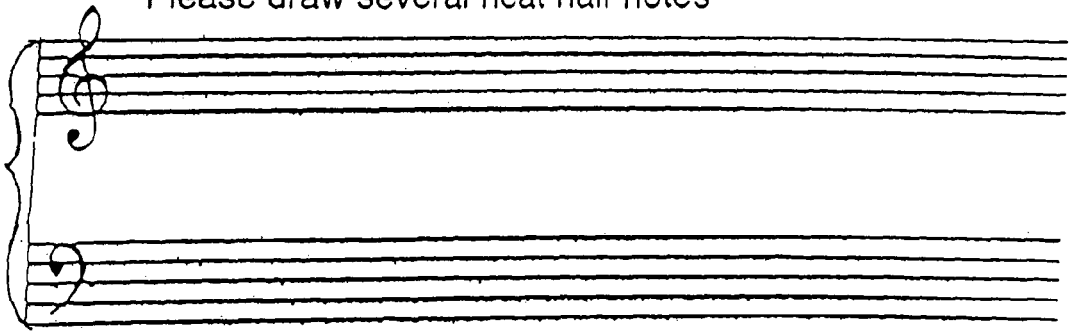
Figure 10:
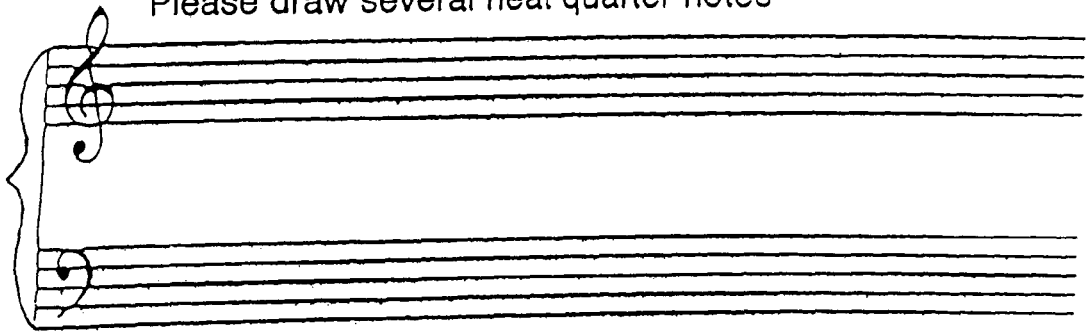
Figure 11:
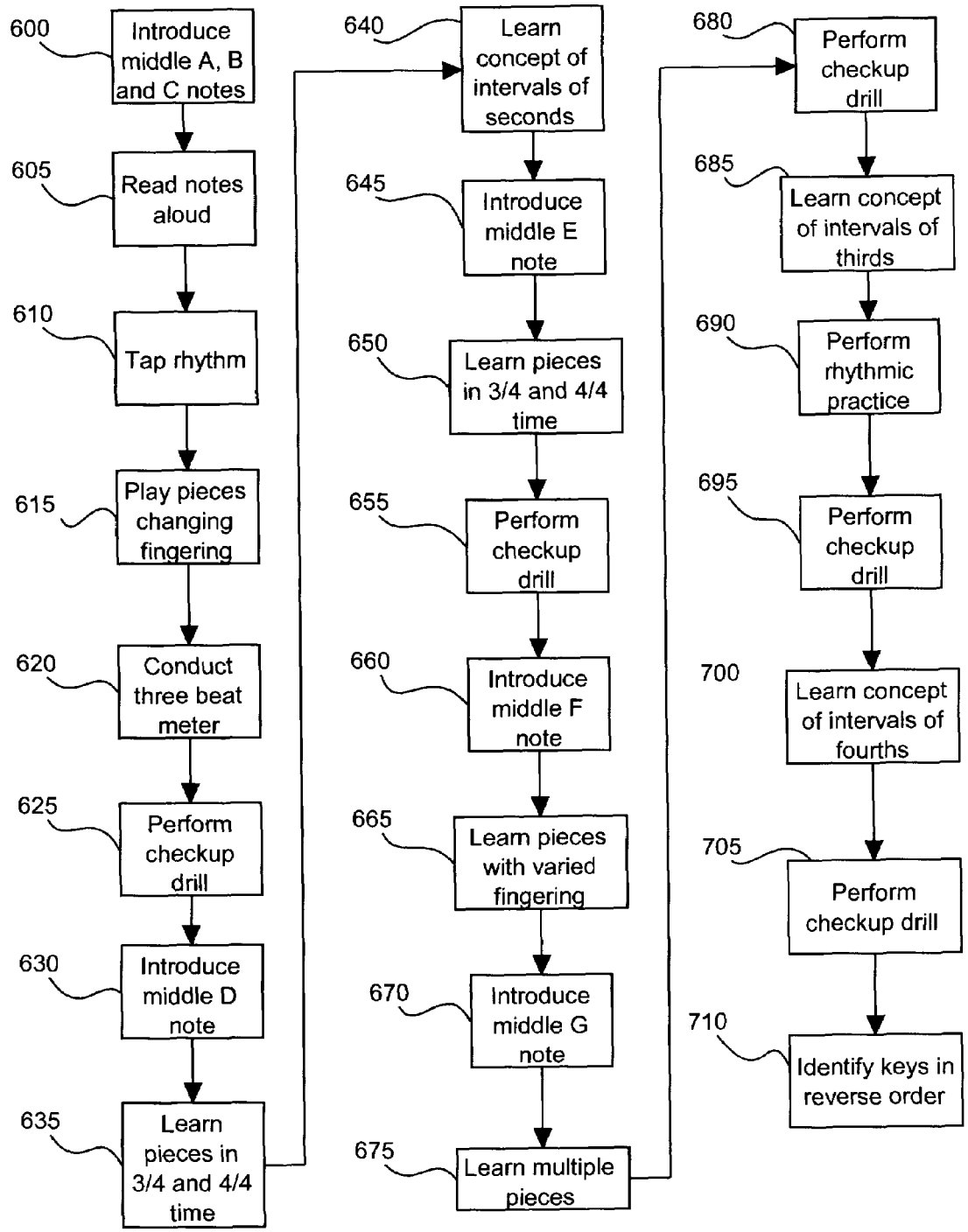
FIG. 11 is a flow chart in block diagram form showing the process for introducing students to the middle set of the seven alphabetical notes/keys and basic rhythmic concepts.
Figure 12:
FIG. 12 illustrates several bars of music used to train reading and playing skills for the musical notes A, B and C.
Figure 12:
Figure 12:
Figure 14:
FIG. 14 is an exemplary illustrative page showing the type of checkup drill to which students are recurringly exposed throughout the method of this invention.
Figure 14:
Figure 14:
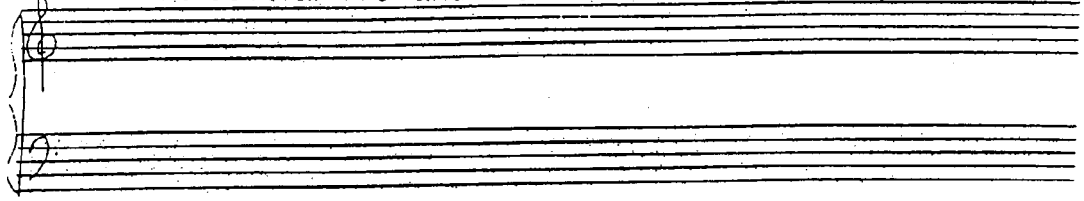
Figure 14:
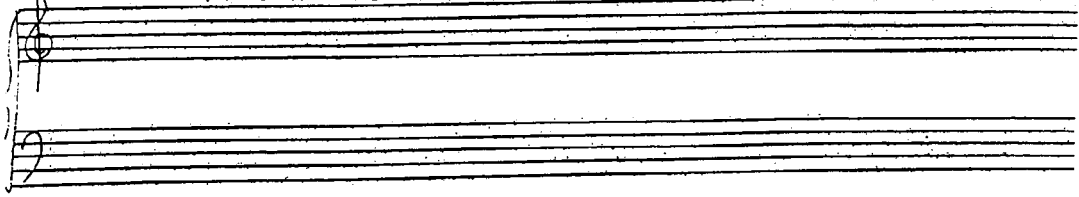
Figure 14:
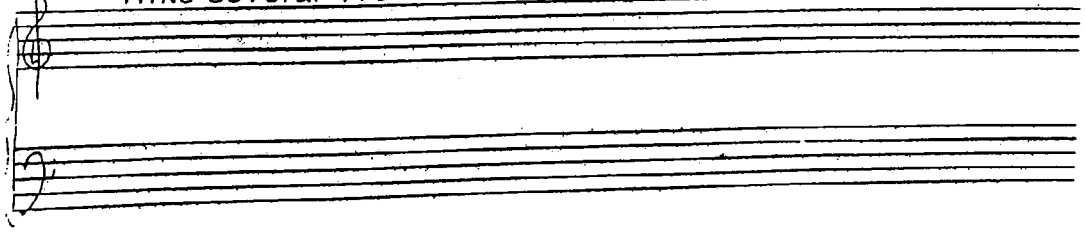

FIG. 11 shows a flow chart in block diagram form of the details of the process by which students are taught the middle set of seven alphabetical notes/keys. At 600, the notes A, B and C are each sequentially introduced using a note introduction page analogous to that shown in FIG. 10 which requires the student to draw whole, half and quarter notes in the proper location on the Bass Clef, and, in the case of the C note, in relationship to both the Bass and Treble Clefs. The student is now prepared to read and play his/her first musical pieces. Short musical pieces specifically facilitating only recognition of the A, B and C notes are taught. Excerpts of 4 bars of such musical pieces for each of the A, B and C notes are presented in FIG. 12. For each piece, the student reads aloud the notes at 605 and then taps the rhythm associated with that piece at 610. Alternatively, the note letter names may themselves be read in rhythm. Then, the student plays the piece at 615 several times using first three adjacent fingers of the left hand (4, 3, 2) and then again several times using three different adjacent fingers of the left hand (3, 2, 1). This approach of playing several times is then repeated using the correspondingly numbered fingers of the right hand, i.e., 2, 3, 4 and 1, 2, 3. This manner of teaching the playing and reading of music is especially important because it deviates from prior methods which focus on mandatory fingering and positioning rigidly tied to key notes being played. In prior art methods, students play with each hand in one specified position for a long time in order to get students used to having one finger on one specific key. By contrast, the system of this invention fosters flexibility in finger positions for the student and has as a goal teaching students to associate an A note with a particular key on the piano keyboard rather than with a particular finger on a specified hand. Thus, students learn to quickly adapt to the reality that logical and efficient fingering placements will change whether from repetition to repetition of the same piece or from piece to piece as playing level advances. Reading of notes is an absolute necessity since situations in which lasting associations can be made between specific notes and specific fingers do not occur. In this method, no standard or fixed finger positioning is taught. At 620, the student is introduced to a different meter by being instructed to move a conductor's baton to a three beat meter as shown in FIG. 13. At 625, the student's understanding of the notes learned to date and of their durational values is tested by means of checkup drills asking the student to name depicted notes and their durations and to write specified sets of notes using any desired durational values. Such checkup drills recur frequently throughout this method. FIG. 14 is an example of a page illustrating such drills for the notes A, B and C. Later checkup drills are formatted similarly. After introduction of the note D at 630 with a note introduction page, the student is required to draw whole, half and quarter notes in the proper location on the Treble Clef using that page. Then, the student must identify, tap the rhythm for and play notes in specially written musical scores. The first such piece, written in 3/4 meter, and the second, written in 4/4 meter, are presented at 635, followed by discussion and demonstration of the concept of musical intervals, more particularly seconds, at 640. A second is a musical interval according to which musical notes and the keys for playing those notes are located adjacent to each other, for example, A and B or C and D. After the note E is introduced at 645, again with a note introduction page, the student is required to draw whole, half and quarter notes in the proper location on the Treble Clef. Whenever new notes are introduced, students are instructed to continue recitation and practice of the musical alphabet learned to date both forwards and backwards. Then, the student must identify, tap the rhythm for and play notes in specially written musical scores at 650. Pieces are in 3/4 or 4/4 meter, and use all notes learned to date. Whereas, several previously introduced note-reading pieces required the use of only one hand or the other, several new pieces are introduced in which two hands are required to play the melodic notes, as well as including a few measures with hands together and/or double notes on one hand. A further checkup drill involving the notes A through E is used asking the student to name depicted notes and the number of counts each such note receives at 655 and to write selected notes on a blank Grand Staff. After the introduction of E, there are an increasing number of new pieces in which the student uses both hands at the same time as they read both clefs, even including double notes for one hand or the other. Next, the F note is introduced at 660, again using a note introduction page. In the musical pieces used to practice the F note at 665, the student continues to experience that fingering for the same notes can vary within the same piece and from piece to piece and is taught that previously learned notes may be written in different ways such that they appear on ledger lines between the Bass Clef and the Treble Clef. In addition, the pieces learned at 665 are written in either 3/4 or 4/4, and at least one of those pieces requires the left hand to cross over the right while playing. Several pieces present what are physically and technically very easy formats in which multiple notes (as many as three or four) are sometimes played together using both hands. Finally, the G note is introduced at 670. Multiple musical scores are introduced at 675 incorporating all of the musical notes studied by the student thus far. One or more of these pieces are written so as to require the student to use alternating hands and/or both hands together as well as to require a variety of finger placements to play the notes. A checkup page involving the notes A through G is used at 680 asking the student to name depicted notes and the number of counts each such note receives as well as writing selected notes on a blank Grand Staff.

Figure 15:
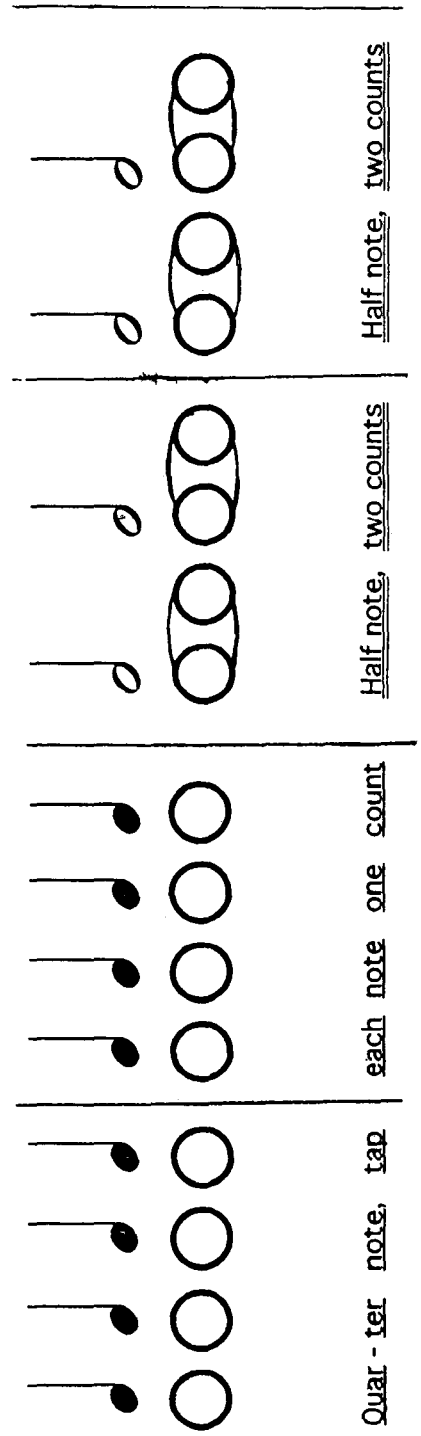
FIGS. 15 and 16 are guides to be used by students in practicing counting and rhythm.
Figure 15:
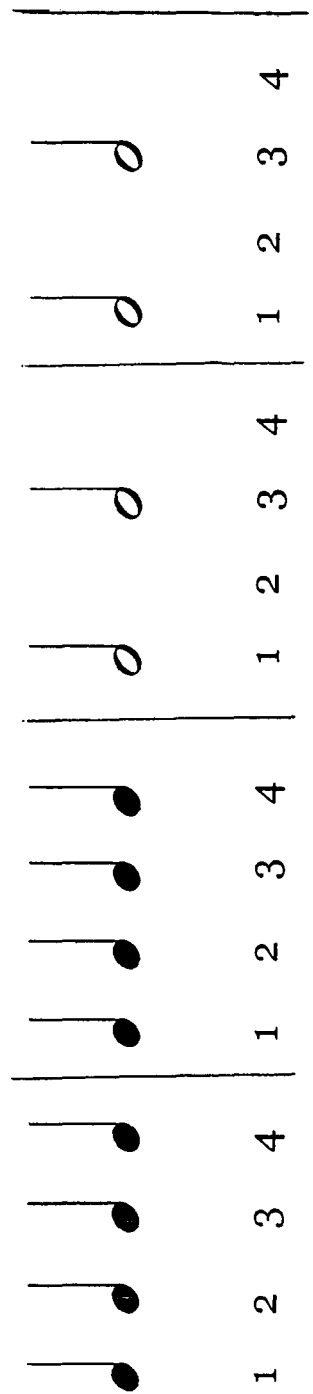
Figure 16:
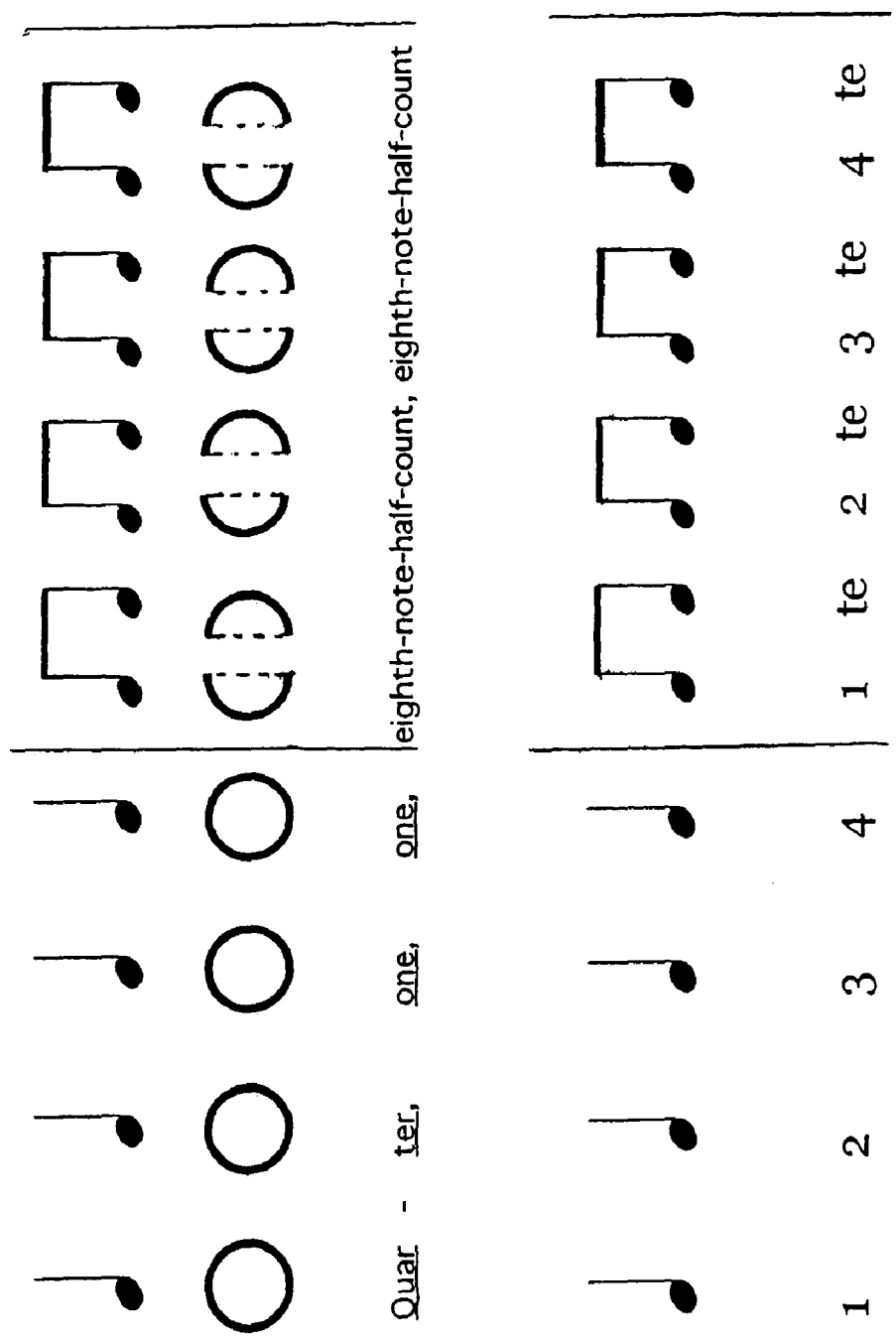
Figure 17:
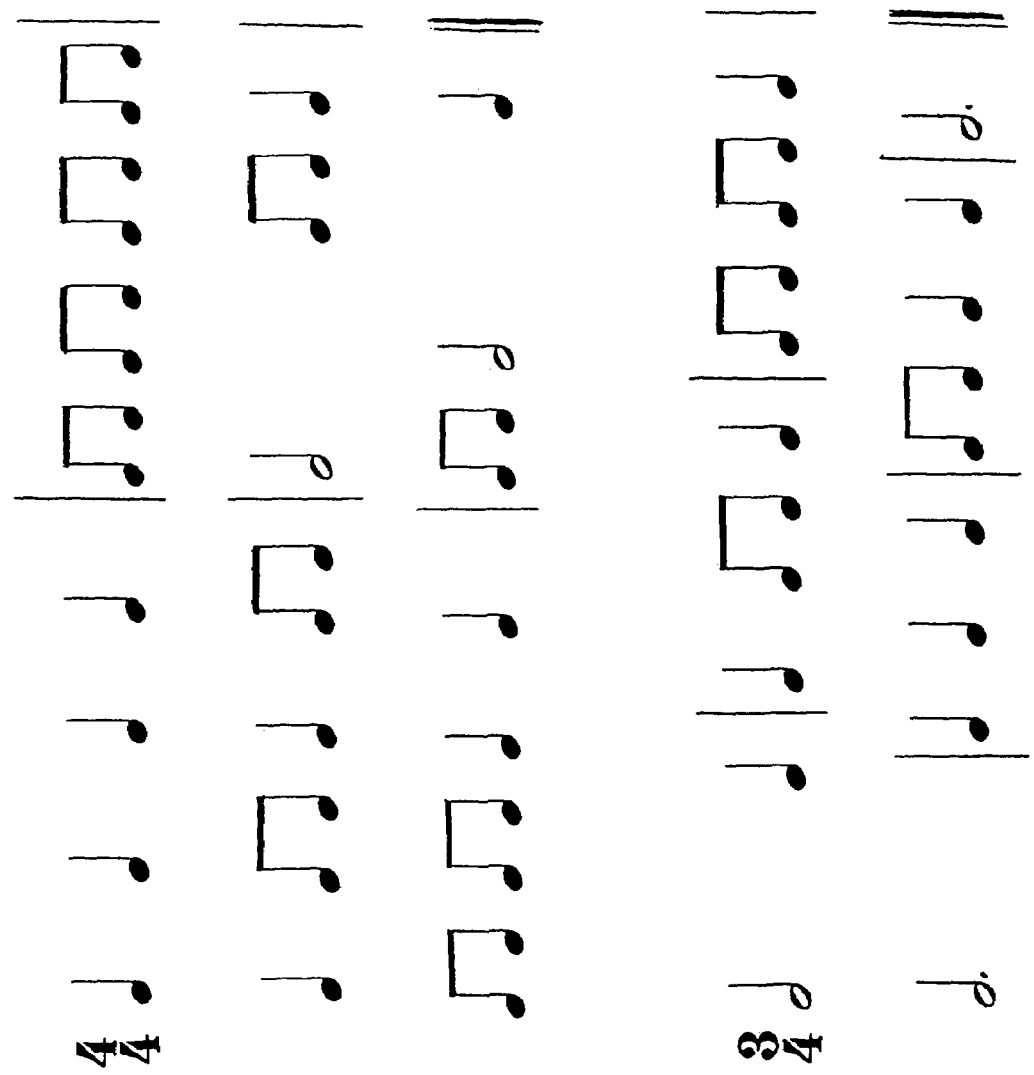
FIG. 17 displays two short rhythmic pieces used to practice the rhythmic concepts of FIGS. 15 and 16.

The process then moves on to focus on a new rhythmic concept, as described below. Another example of a musical interval, a third, is presented at 685. An interval of a third occurs when there is a skip of one note between two notes (such as A to C), a skip of one key between two keys or when there is a skip of one letter name between two letter names. A musical piece demonstrating intervals of a third is also included as part of this process. Guides to provide visual aid to the student in practicing counting and rhythm are shown in FIG. 15 and FIG. 16 in which empty circles are used to represent quarter note values, "connected double circles" for half notes and "half circles" for eighth notes which are introduced for the first time at this point. These visual illustrations are used to help the student understand the relative values of eighth notes to quarter notes and to half notes. Many students simply think that eighth notes go fast with no idea of how fast. The usual result is that eighth notes are played too fast. By seeing a single half circle representing the eighth note while seeing a single circle representing an already-learned quarter note and two connected circles representing an already-learned half note, the student is presented with both a visually and mathematically/geometrically accurate proportional picture of the durational relationships between these three different note values. In the past, visual/geometric illustrations have not been used in piano methods. Since rhythm simply has to do with proportionally related longer and shorter durations superimposed over a steady pulse all occurring during the steady passing of time, this method of facilitating the comprehension of rhythmic concepts is both appropriate and effective. Students practice tapping, counting and writing symbols on the two "rhythmic" pieces shown in FIG. 17 using these displays at 690. Another checkup drill is presented at 695 to train students to read notes in reverse alphabetical order, write $2^{nd}$ intervals, and write notes using ledger lines between the Bass Clef and Treble Clef. Yet another example of a musical interval, a fourth, is presented at 700. An interval of a fourth occurs when there is a skip of two notes between two notes, when there is a skip of two keys between two keys or when there is a skip of two letter names between two letter names. The student is trained at 705 on a checkup page in identifying notes A through G as well as intervals of 2nds, 3rds and 4ths. Finally, the student is instructed at 710 to identify all white keys appearing on the keyboard from right to left (backwards) while using each D key as a checkpoint.

Figure 18:
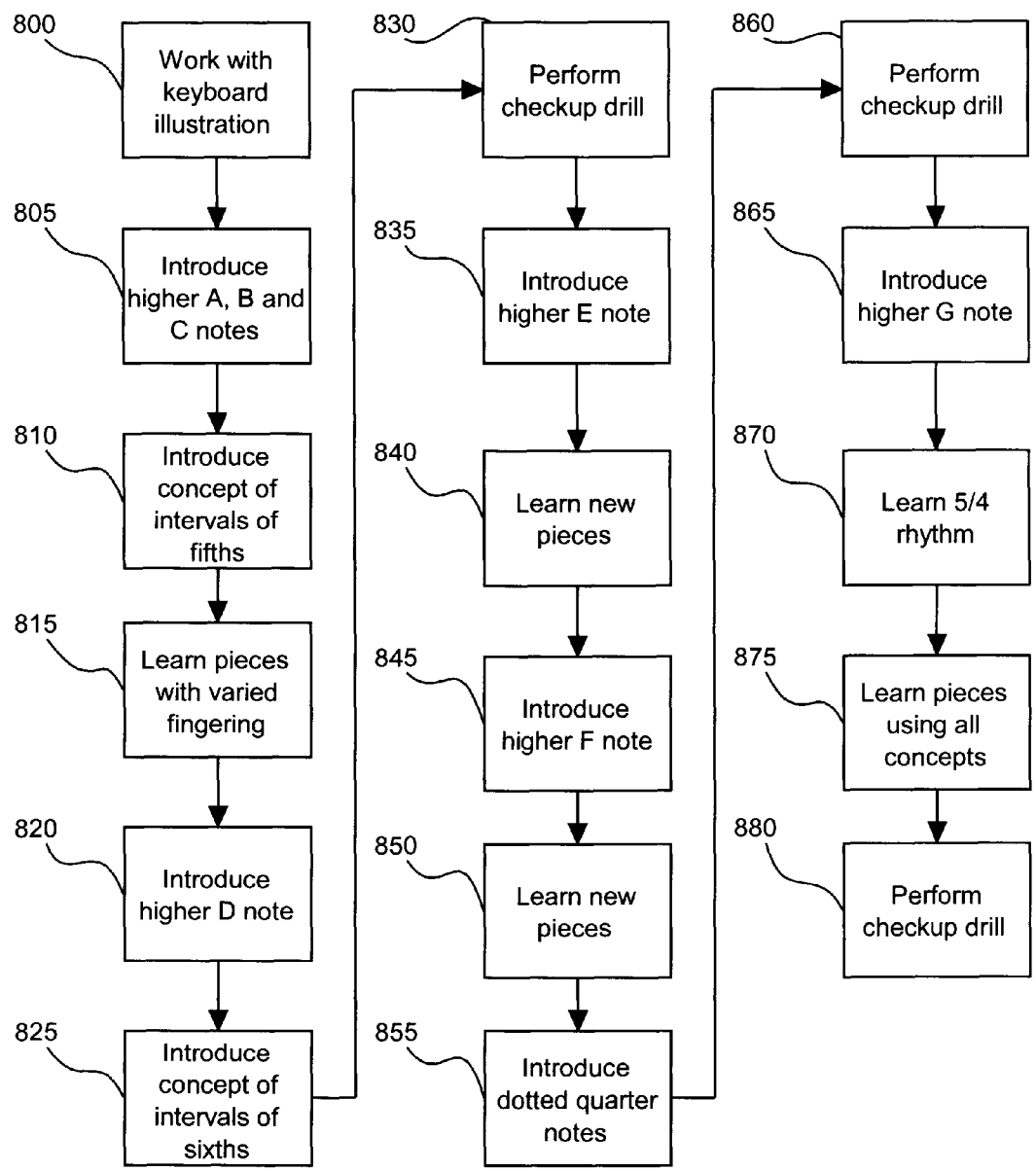
FIG. 18 presents a flow chart in block diagram form of the process by which the adjacent higher set of seven notes/keys and more complex rhythmic concepts are taught.
Figure 19:
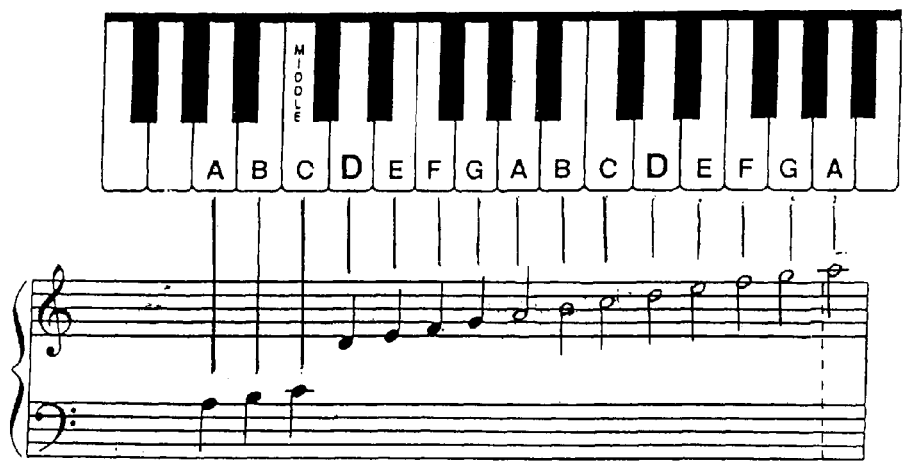
FIG. 19 illustrates a portion of the piano keyboard associating individual keys with each of the seven notes of the middle set of notes from A to G and with each of the seven notes of the adjacent higher set of notes from A to G.

As described above, each note/key of the adjacent higher set of seven alphabetical notes/keys is introduced to the student at 60 in alphabetical sequence from A to G even including an extra above-Treble Clef A on the first ledger line to encourage students to "think outside the box" so that they are aware that the sequence of seven-note sets continues just the same not only on the keyboard but also as written notes. Several of the pieces used in introducing this adjacent higher set include this A. In addition, more progressively advanced rhythm instruction continues. FIG. 18 shows a flow chart in block diagram form of the details of the process by which students are taught the adjacent higher set of seven alphabetical notes/keys. Prior to beginning separate study of this higher set, at 800 of FIG. 18, the student is shown a drawing of a keyboard above a Grand Staff. In the drawing, an example of which is presented in FIG. 19, quarter notes are associated with white keys A to G in the middle set of alphabetical notes/keys and half notes are associated with white keys A to G in the next higher set of alphabetical notes/keys. The teacher uses the illustration of this figure to drill the student in identifying the note names, respective clef and keyboard positions and associations between keys and notes. The student must place any finger of either hand on a key corresponding to the written note or key on the illustration pointed to by the teacher. The drill involves both speaking and playing the indicated notes.

As with the middle set, each note in the higher set is separately introduced together with a description of where it is found on the respective clef. The student is then requested to draw several examples of whole, half and quarter note signs representing the newly introduced note having varying durations on a note sheet. This same general procedure is followed for each note in alphabetical sequence. The locations for each note in the higher set are presented to the student along with each new note as described in Table 2:

TABLE 2

| Note | Clef Location Description |
|---|---|
| A | higher A is the note on the second space of the Treble Clef |
| B | higher B is the note on the third line of the Treble Clef |
| C | higher C is the note on the third space of the Treble Clef |
| D | higher D is the note on the fourth line of the Treble Clef |
| E | higher E is the note on the fourth space of the Treble Clef |
| F | higher F is the note on the fifth line of the Treble Clef |
| G | higher G is the note on a space above and touching the fifth line of the Treble Clef |

Figure 21A:
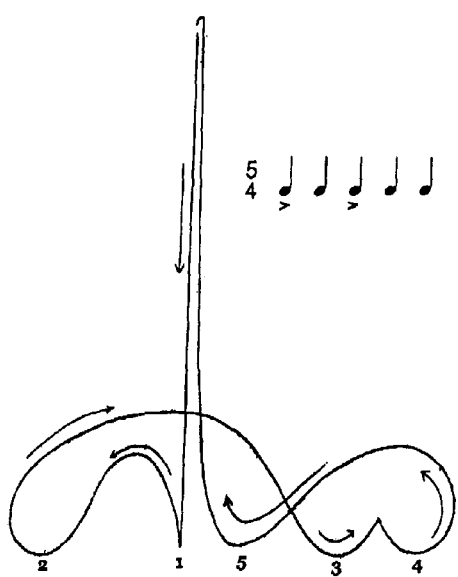
FIG. 21A and FIG. 21B present motions of a conductor's baton while directing music in 5/4 time.
Figure 21B:
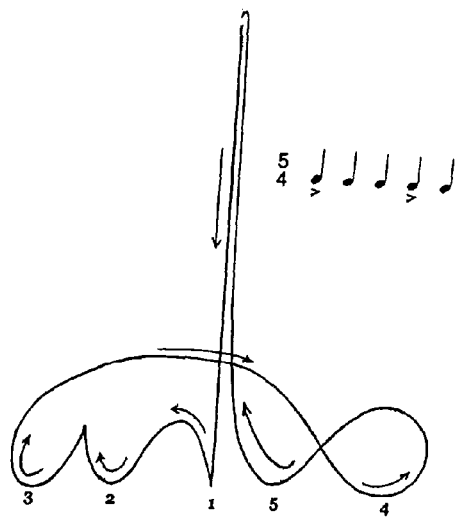
Figure 20:
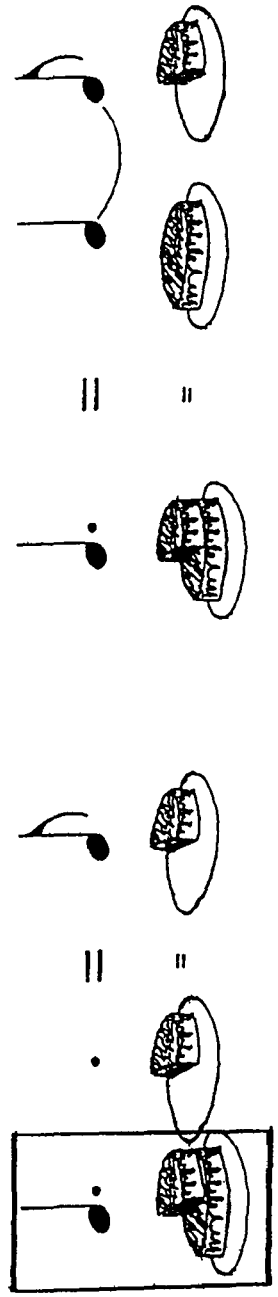
FIG. 20 is an illustration used to further examine the musical concept having to do with dotted quarter notes and demonstrating that the value of the dot equals the value of an eighth note.

From this new higher set, the notes/keys A, B and C are introduced sequentially at 805, each using a note introduction page analogous to that shown in FIG. 10 and each incorporating the relevant information for the respective note from Table 2. The student is requested to draw each new note in various durations (whole, half and quarter notes) on the Treble Clef. At 810, intervals of fifths are introduced. An interval of a fifth occurs when there is a skip of three notes between two notes, when there is a skip of three keys between two keys or when there is a skip of three letter names between two letter names. The student must name notes in various examples of fifths and must write independently generated examples of fifths. At 815, the student learns to play several new pieces incorporating the original middle set of notes/keys along with the first three notes/keys of the higher set, A, B and C. Fingering for playing the same note may differ within the same piece and from one piece to the next. Some pieces include interior ledger line notes. Meter for these pieces varies between 4/4 time and 3/4 time, and at least one piece also incorporates eighth notes. Certain pieces also include dynamic and articulation markings for the first time. At 820, the higher D note/key in this higher set is presented, and the student must draw this note in whole, half and quarter note durations on the Treble Clef. Intervals of sixths are presented at 825. An interval of a sixth occurs when there is a skip of four notes between two notes, when there is a skip of four keys between two keys or when there is a skip of four letter names between two letter names. The student must name notes in various examples of sixths and must write independently generated examples of sixths. A checkup providing drills with all notes learned thus far is presented at 830 together with a drill requiring the student to identify illustrated eighth note values. After the higher E note is presented at 835, the student learns pieces combining the newly and previously learned notes at 840. The rhythmic complexity of the pieces which the student learns progressively increases as each new note and each new rhythmic concept are learned and some of the new pieces incorporate notes appearing on interior ledger lines occurring between the Bass Clef and the Treble Clef. Following introduction of the higher F note at 845 and use of that note in pieces at 850, dotted quarter notes are introduced at 855 as illustrated in FIG. 20. The method of this invention makes use of graphic illustrations to demonstrate mathematical and musical concepts to the student. In FIG. 20, a visual illustration including relevant musical notes is presented in which a cake represents a quarter note, half a cake represents either the dot following the quarter note or an eighth note. Similar to the use of circles and half circles, the proportional relationships between quarter notes and eighth notes are expressed, and the student learns in this illustration that the dot after the quarter note is equal to the value of an eighth note. In 4/4 or 3/4 meter, that would be ½ count. A dotted quarter note could also be written as a quarter note tied to an eighth note. In either case, it would equal 1 and ½ counts. FIG. 20 also shows how counting occurs when eighth notes appear. When only numbers are used to indicate a count, those numbers stand for the basic pulse of the music. In 4/4 meter, the numbers stand for quarter-note pulses (for 100% of each of those quarter-note pulses). So, if there is a whole note, the value of four quarter notes is counted thusly—"1 2 3 4". However, when eighth notes are introduced, new symbols are required, and the count becomes "1 te 2 te 3 te 4 te." The value of the symbol "1" changes. Before it stood for all of the count, but, now it stands for the first half of the first count. And, "2" stands for the first half of the second count, and so forth. The "te's" stand for the last half of each count. Then, at 860, a checkup page is provided. Next, the higher G note is presented at 865 followed by instruction for the student in how to conduct 5/4 meter music with a baton motion at 870. Two versions of these conducting patterns are presented in FIGS. 21A and 21B. These figures incorporate the use of accents (>) with each pattern. These accents serve to show the arrangement of primary and secondary stronger pulses within the measure. In one, these stronger pulses happen on beat 1 and beat 3, while in the other, the stronger pulses happen on beat 1 and beat 4. In the conducting patterns, these stronger pulses are demonstrated by the stronger "down" motion of the conductor's baton. Thereafter, multiple pieces incorporating all of the notes learned to date are provided at 875. These pieces include the use of crossing hands, reading left hand in the Treble Clef, various extensions in which the fingers on one hand or the other extend beyond the 5-note range, sharps and 5/4 meter. Fingering for identical notes changes from piece to piece. Finally, at 880 a checkup page drills the students on all notes provided to date including durational values for each.

Figure 22:
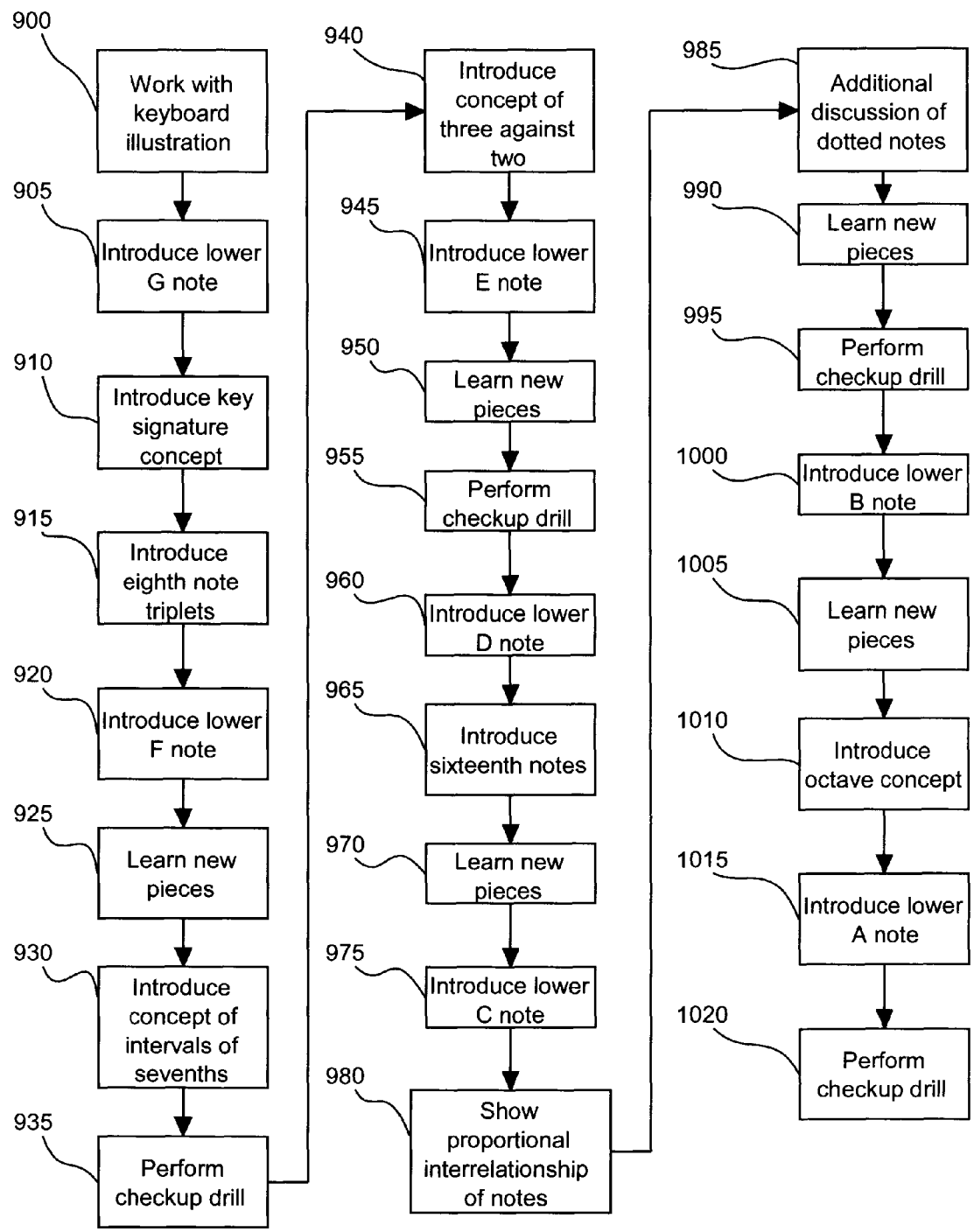
FIG. 22 presents a flow chart in block diagram form of the process by which the adjacent lower set of seven notes/keys, to the left of the middle set, and more complex rhythmic concepts are taught.
Figure 23:
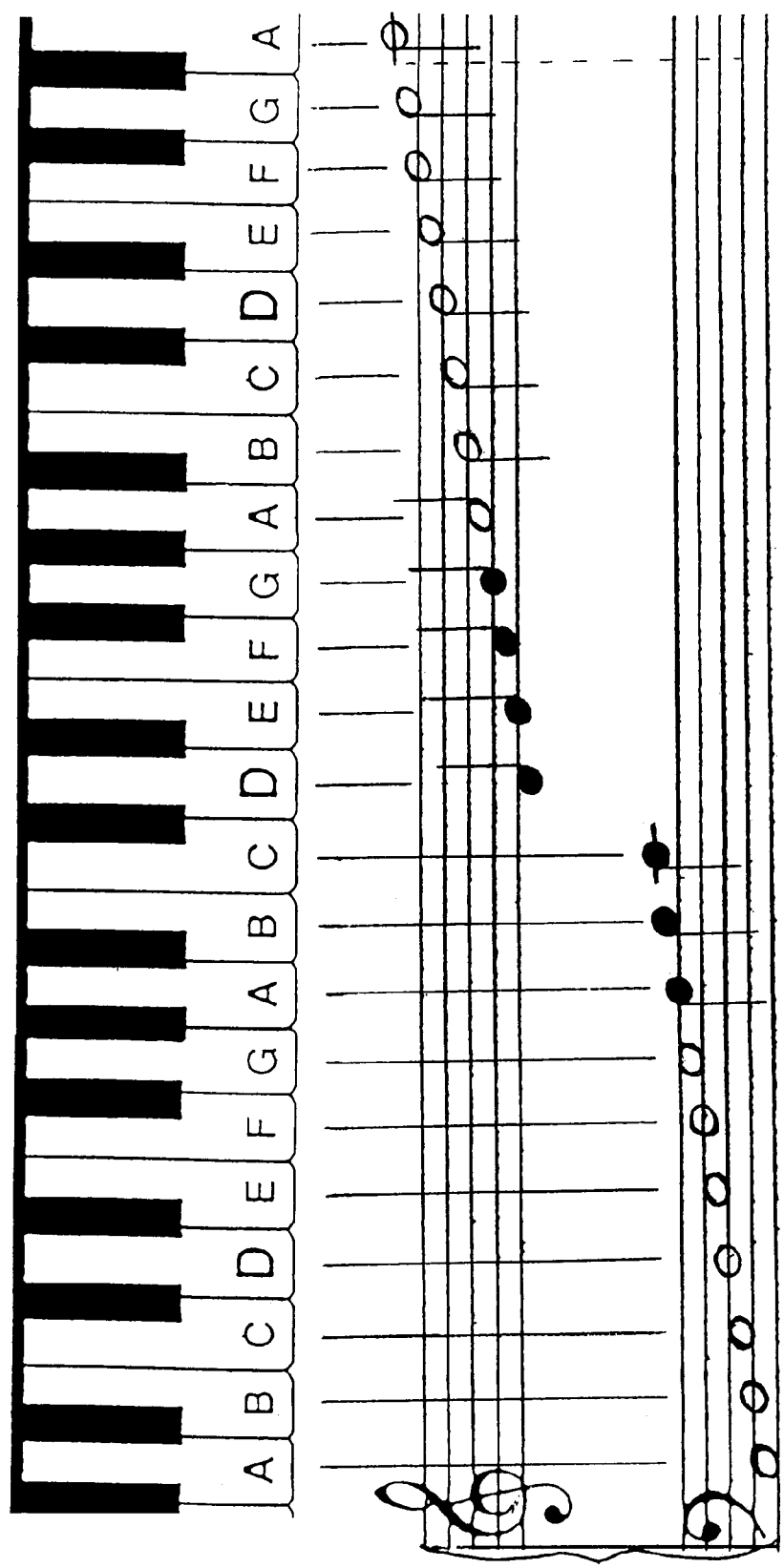
FIG. 23 illustrates a portion of the piano keyboard associating individual keys with each of the seven notes of the middle set of notes from A to G, higher set of seven notes A to G and lower set of seven notes, in this instance, from G to A.

As described above, each note/key of the lower set of seven alphabetical notes/keys, adjacent and to the left of the original middle set is introduced to the student at 70 in alphabetical sequence from G to A together with yet further advanced rhythm instruction. FIG. 22 shows a flow chart in block diagram form of the details of the process by which students are taught the lower set of seven alphabetical notes/keys. Prior to beginning separate study of each of the notes in the lower set of seven alphabetical notes/keys, at 900 of FIG. 22, the student is shown a drawing of a keyboard above a Grand Staff. In the drawing, an example of which is presented in FIG. 24, quarter notes are associated with white keys A to G in the middle set, half notes are associated with white keys A to G in the higher set and whole notes are associated with white keys G down to A in the lower set of alphabetical notes/keys. The teacher uses the illustration of this figure to drill the student in identifying the note names, respective clef and keyboard positions and associations between keys and notes. The student must place any finger of either hand on a key corresponding to the written note pointed to by the teacher. The drill involves both speaking and playing the indicated notes.

As with the middle and higher sets, each note/key in the lower set of seven notes/keys is separately introduced together with a description of where it is found on the respective clef. However, in the case of the lower set, notes are introduced in descending pitch order. The practical reasons for using a descending order is that this order provides a visual connection to what has been taught previously and arises from the natural adjacency of the lower set G to the A of the middle set. This order is also desirable pedagogically since teaching in this manner strengthens the student's confidence by showing the student that notes can be learned both by going up in pitch and going down in pitch. Students who do struggle with note-reading inevitably struggle even more when having to read notes that descend melodically because they have never learned to think in reverse alphabetical order. It is crucial that musicians be able to read notes in descending order as well as in ascending. The student is then requested to draw several examples of whole, half and quarter note signs representing the newly introduced note having varying durations on a note sheet. This same general procedure is followed for each note in alphabetical sequence. The locations for each note in the lower set of seven notes are presented to the student as described in Table 3:

TABLE 3

| Note | Clef Location Description |
| --- | --- |
| G | lower G is the note on the fourth space of the Bass Clef |
| F | lower F is the note on the fourth line of the Bass Clef |
| E | lower E is the note on the third space of the Bass Clef |
| D | lower D is the note on the third line of the Bass Clef |
| C | lower C is the note on the second space of the Bass Clef |
| B | lower B is the note on the second line of the Bass Clef |
| A | lower A is the note on the first (lowest) space of the Bass Clef |

Figure 24:
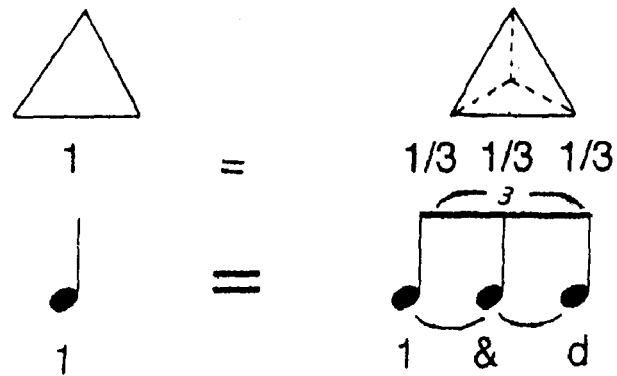
FIG. 24 is used to illustrate eighth note triplets and their associated rhythm.
Figure 24:
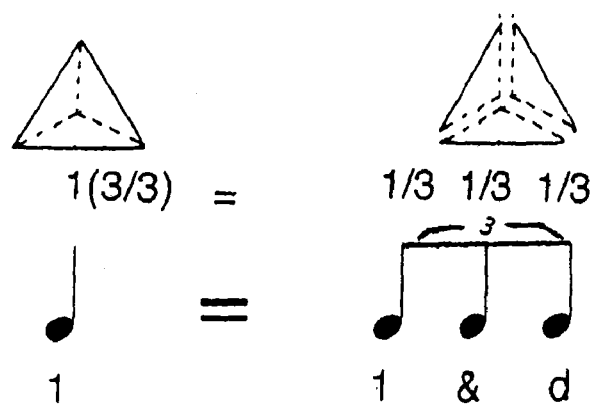
Figure 24:
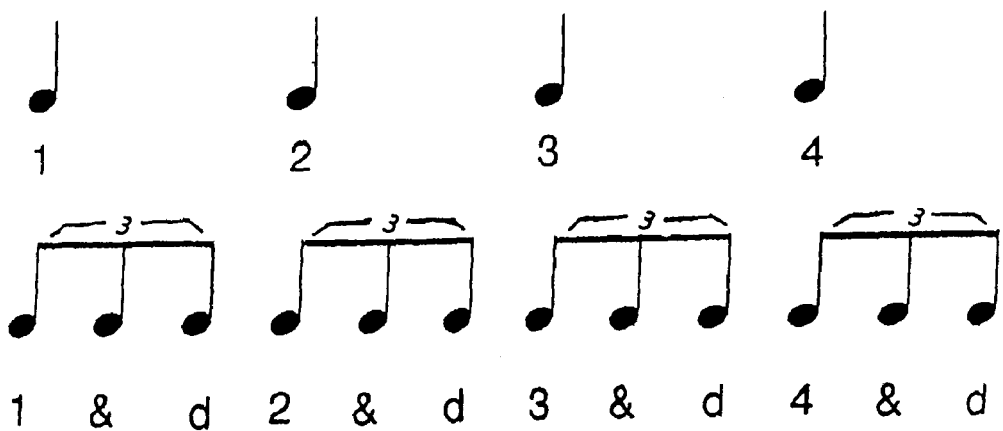

After introduction to the lower set G note at 905 using a note introduction page analogous to that shown in FIG. 10 which incorporates the relevant information from Table 3, the student is requested to draw several examples of whole, half and quarter note signs representing the G note having varying durations on a note sheet. This same general procedure is followed for each note in downward alphabetical sequence from G to A. At 910, the concept of key signature is first shown. A key signature is represented by one or more sharps or flats placed at the very beginning of each score in a piece of music. A note for which a sharp or flat is shown at the beginning of a piece of music must be played as the respective sharp or flat throughout later appearances of that note in the musical piece. The student is provided several pieces of music to be played in G Major to demonstrate the key signature concept. Key signatures can consist of more than one flat or sharp and as many as seven. At 915, the concept of eighth-note triplets is presented for the first time. Three eighth notes in triplet rhythm take the same amount of time as one quarter note: one count. Each note receives ⅓ of the count. They are played evenly and a little faster than regular eighth notes. Such triplets are identified by a bracket above the notes broken by a numeral 3 which is not to be mistaken for a fingering indicator. FIG. 24 provides a graphic in the form of a triangle proportionally divided into three parts, musical notation for eighth-note triplets and text to be spoken in rhythm as a visual and aural aid to understanding the rhythm and pulse of this new concept. At 920, the lower F note is introduced and the student is requested to draw several examples of whole, half and quarter note signs representing the F note having varying durations on a note sheet. This is followed at 925 by several pieces in F Major for the student to learn, one of which also incorporates eighth-note triplets. Additionally, from this point forward, notes for the right hand will occasionally be written in the Bass Clef, and in those situations the right hand will play in the lower area of the keyboard (below the middle set of seven notes). Next, at 930, intervals of sevenths are presented. An interval of a seventh occurs when there is a skip of five notes between two notes, when there is a skip of five keys between two keys or when there is a skip of five letter names between two letter names. The student must name notes in various examples of sevenths and must write independently generated examples of sevenths. A checkup providing drills with all notes learned thus far including eighth note triplets is presented at 935.

Figure 25A:
FIGS. 25A and 25B illustrate the rhythmic concept of three-against-two.
Figure 25A:
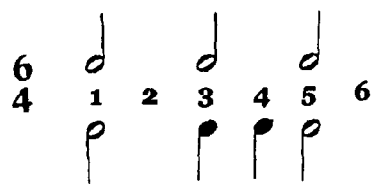
Figure 25A:
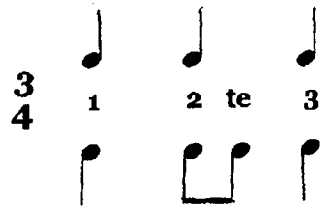
Figure 25B:
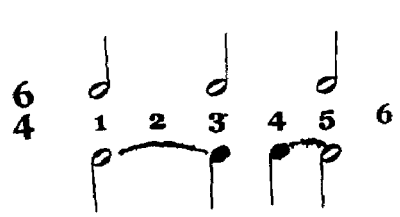
Figure 25B:
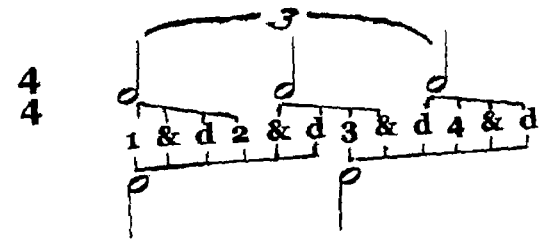
Figure 25B:
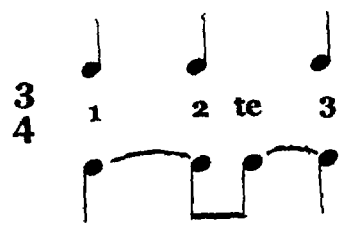
Figure 25B:
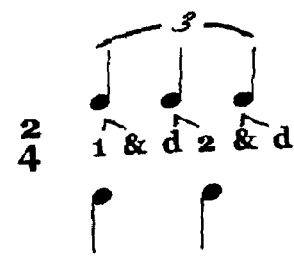
Figure 25B:
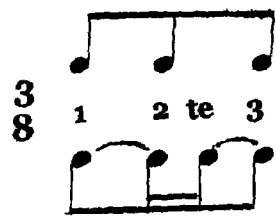
Figure 25B:
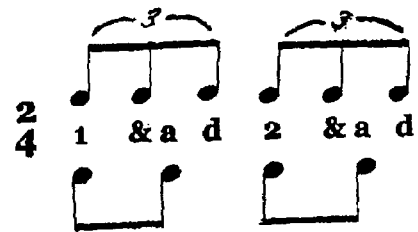
Figure 25B:
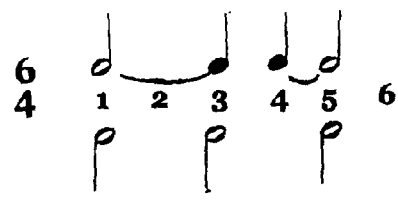
Figure 25B:
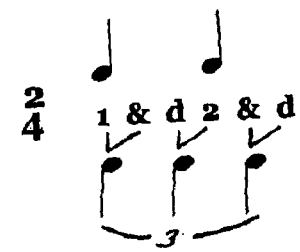
Figure 25B:
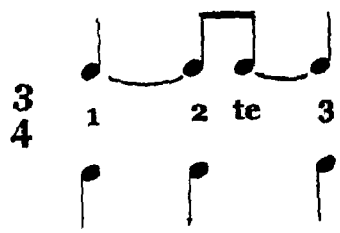
Figure 25B:
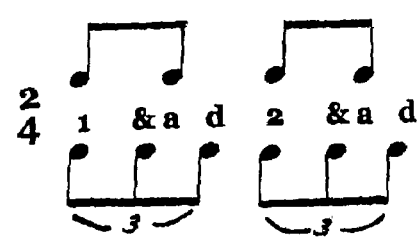

Thereafter, a new rhythmic concept, three-against-two, is presented at 940 and shown in FIGS. 25A and 25B. These figures use a combination of graphic and mathematical illustrations, verbal explanations, as well as notational examples with counting symbols to demonstrate and explain the proportional rhythmic relationships that occur when there are three equal notes which must be played during the same time period as two equal notes. Some students are perplexed when presented with the notation demonstrating this situation at the top of FIG. 25A. However, as the following two mathematical illustrations using divided blocks and the counting notations at the bottom of FIG. 25A show, there need be no confusion generated by such a musical requirement. There are several ways that three against two can be notated, as shown in FIG. 25B, but no matter which meter is used, or which types of notes are used, and no matter which counting symbols are used, the rhythmic result is exactly the same. As illustrated, there can be, for example an eighth-note triplet played during the same time period as two eighth notes, or by contrast, three quarter notes in 3/4 meter played on one hand while the other hand plays what is in effect two dotted quarter notes (notated as a quarter tied to an eighth note and an eighth note tied to a quarter note). FIG. 25B presents further examples of three against two rhythm which the student is meant to tap with both hands, first with the right louder than the left and then with the left louder than the right. Sometimes, students do not realize that the rhythmic result is identical, and the information and drills in the aforementioned figures are intended to demonstrate that fact. At 945, the lower E note is introduced and the student is requested to draw several examples of whole, half and quarter note signs representing the E note having varying durations on a note sheet. This is followed at 950 by several pieces in the keys of A and E, one of which utilizes three-against-two rhythm. Once again, at 955, a checkup on the most recently learned concepts occurs. Students are asked to name all notes learned thus far in descending order, and then write them ascending alphabetically from Bass Clef to Treble Clef. This check up also includes an example in which students must write in counting symbols and play rhythms of three against two At 960, the lower D note is introduced and the student is requested to draw several examples of whole, half and quarter note signs representing the D note having varying durations on a note sheet.

Figure 26A:
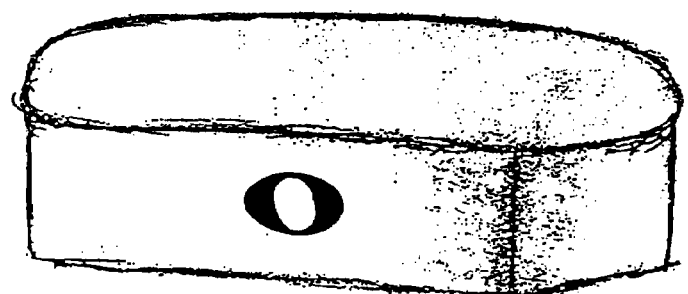
FIGS. 26A, 26B, 26C and 26D introduce sixteenth notes and illustrate how various notes or different duration are proportionally interrelated.
Figure 26A:
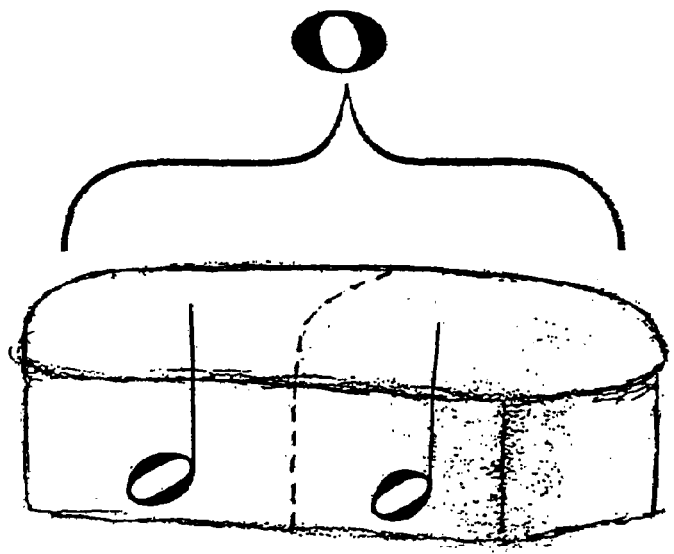
Figure 26A:
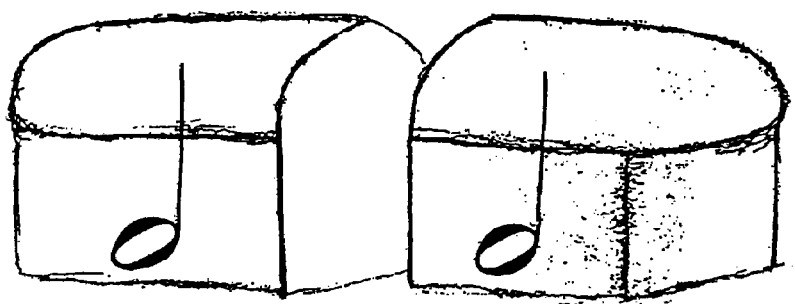
Figure 26B:
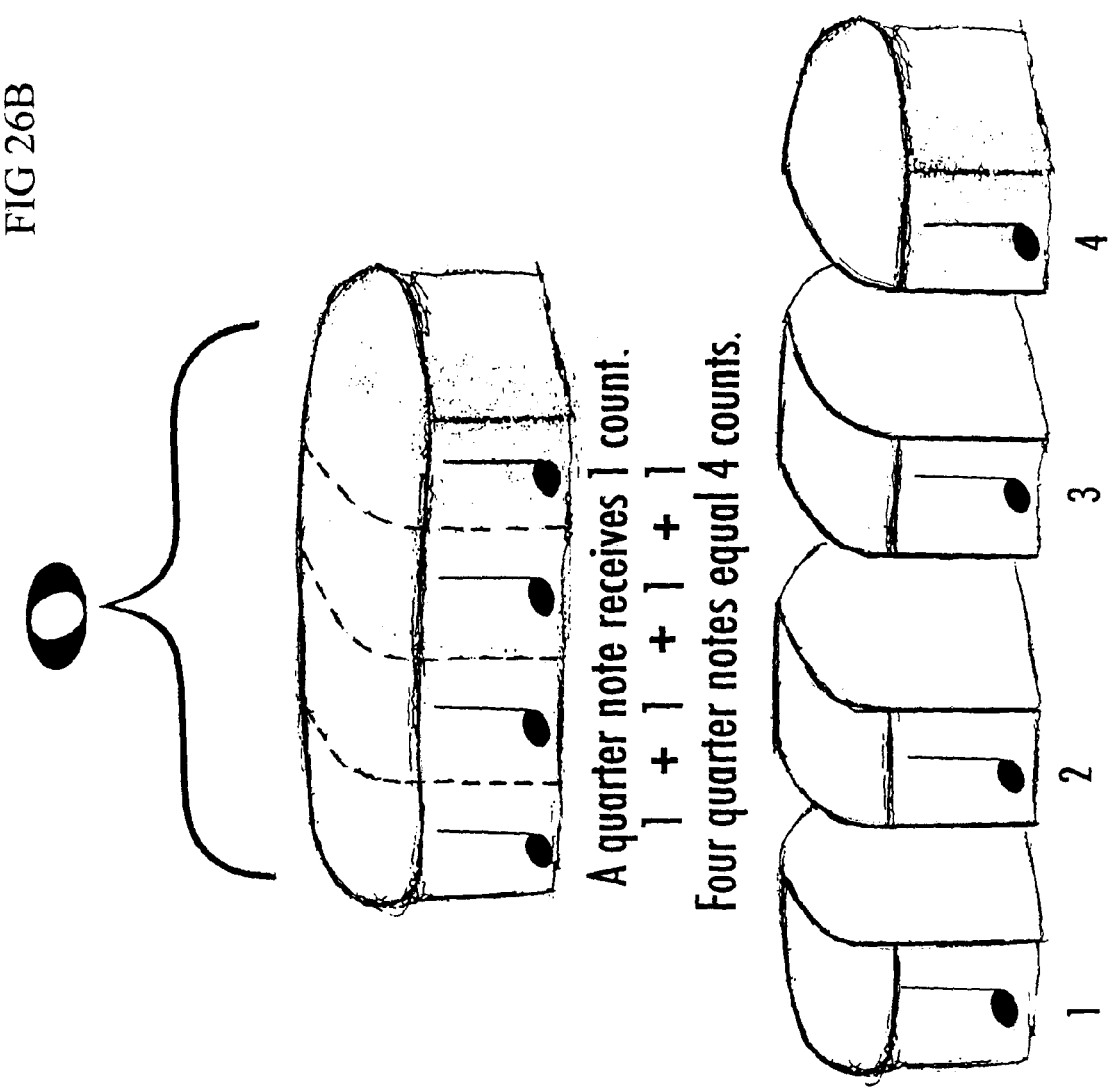
Figure 26C:
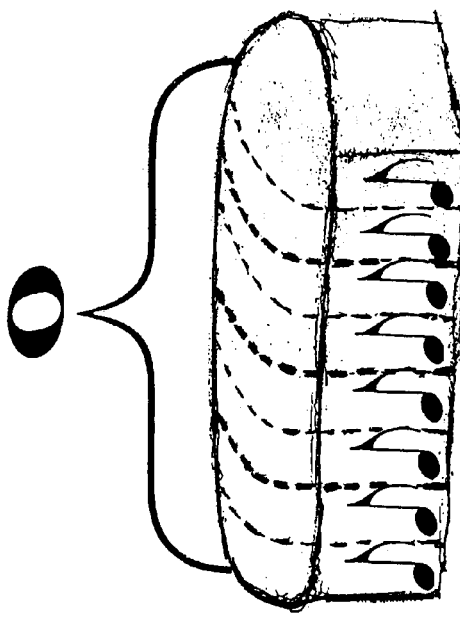
Figure 26C:
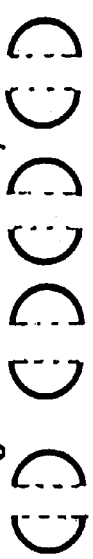
Figure 26C:
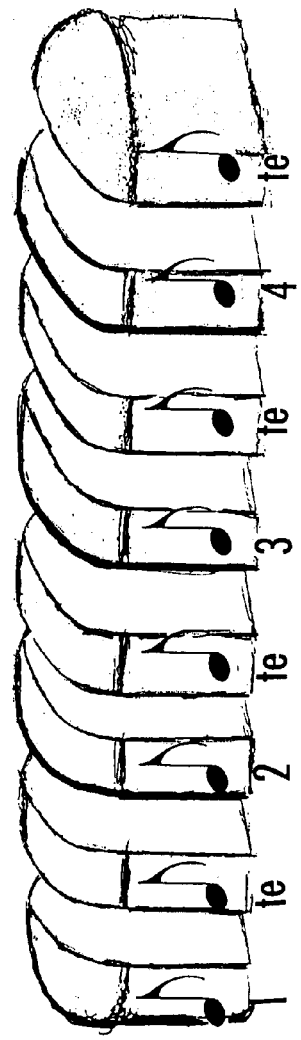
Figure 26D:
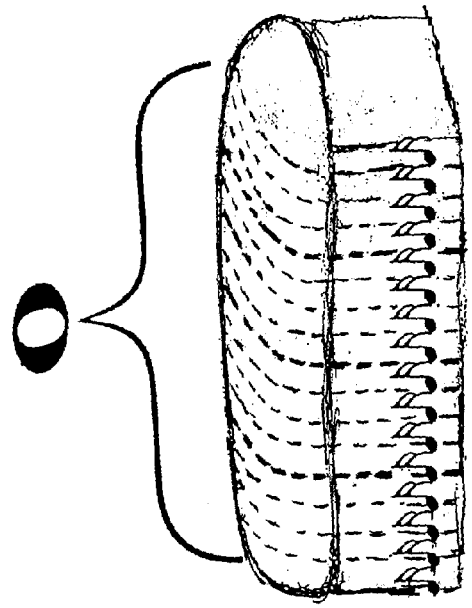
Figure 26D:
Figure 26D:
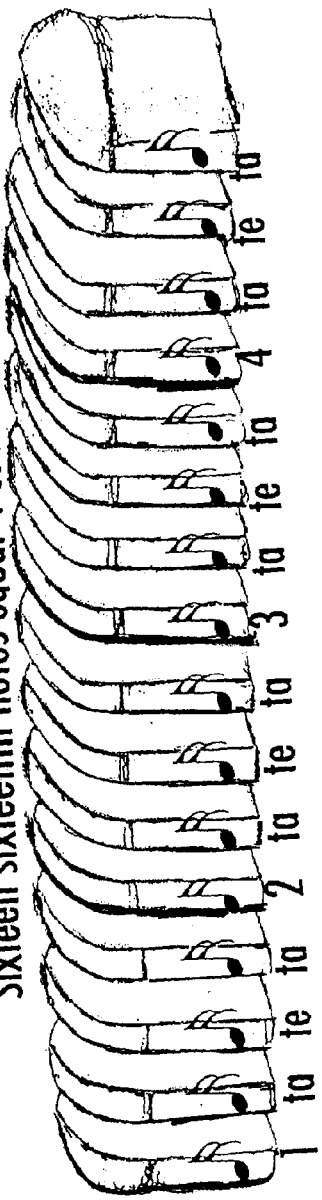
Figure 27:
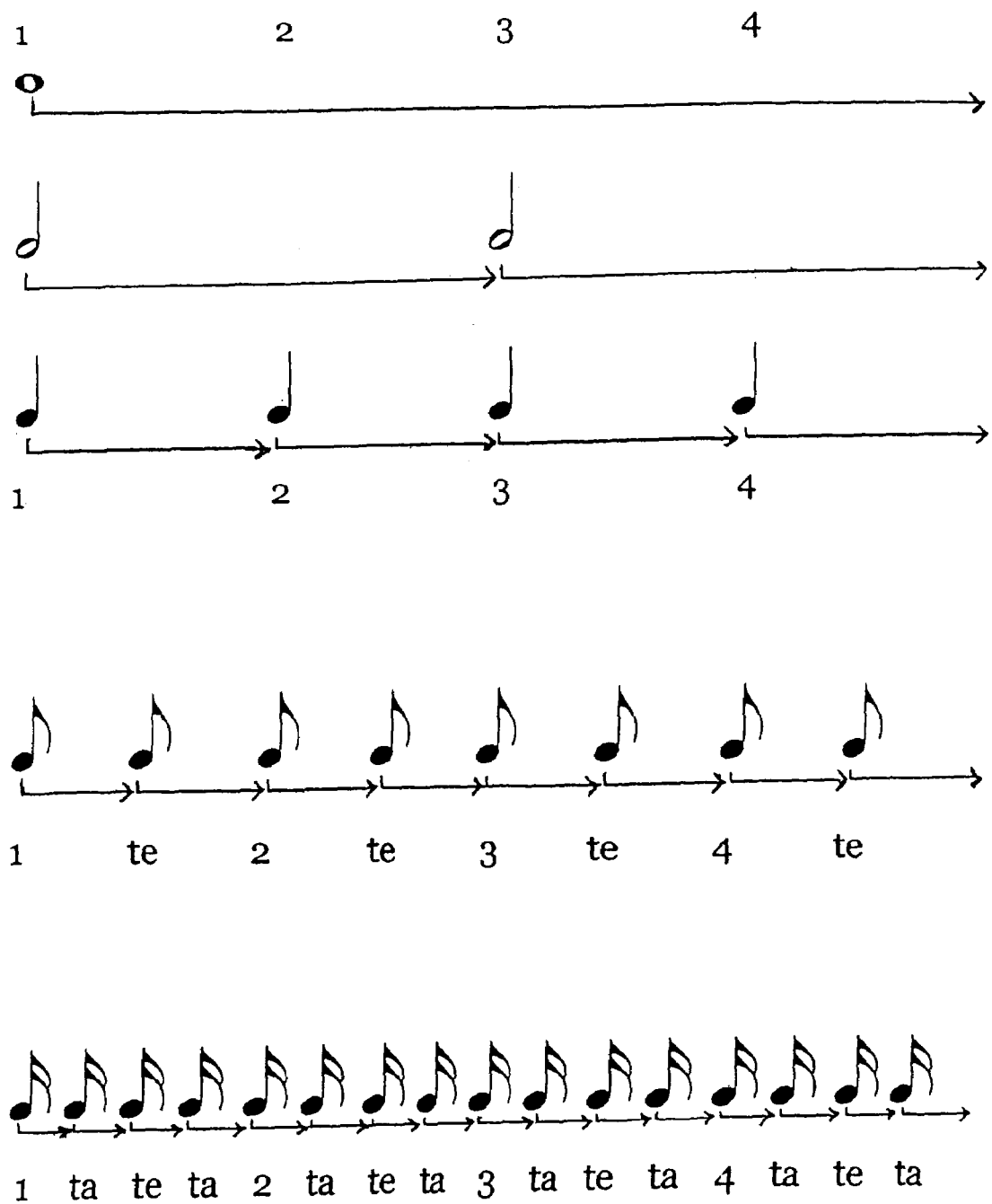
FIG. 27 provides a graphic showing the linear interrelationship of various musical notes of different duration.
Figure 28A:
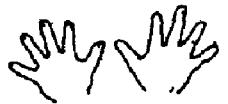
FIG. 28A and FIG. 28B demonstrate the use of ratios to determine the value of the dot when following notes of various durations.
Figure 28A:
Figure 28A:
Figure 28A:
Figure 28A:
Figure 28A:
Figure 28B:
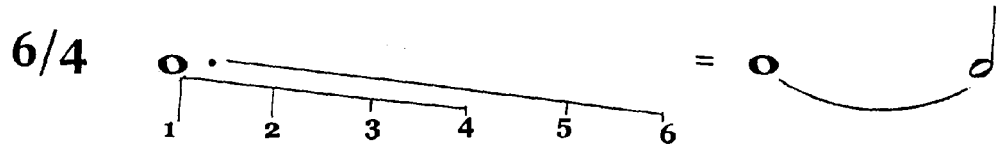
Figure 28B:
Figure 28B:
Figure 28B:

The proportional subdivision of whole notes into half, quarter, eighth and sixteenth notes is introduced at 965 and shown in FIGS. 26A, 26B, 26C and 26D. A loaf of bread whole and "sliced" in half, fourths, eighths, and sixteenths is used as a graphic illustration together with musical notation and text to demonstrate and guide the student in an understanding of the rhythm and duration of these various notes in comparison with each other. As shown in FIG. 26A, in 4/4 meter, a whole note receives 4 counts (the whole loaf of bread). A half note receives 2 counts so that two half notes equal the whole loaf of bread and 4 counts. FIG. 26B illustrates the treatment of quarter notes using the same bread loaf analogy. In FIG. 26C, when the loaf is "sliced" into eighths, the half circles which were related to eighth notes in earlier illustrations are again used; and, in FIG. 26D, when the loaf is "sliced" into sixteenths, these half circles are then "broken" into quarter circles to demonstrate the one-fourth count received by the sixteenth note. More complex pieces using lower D and other previously learned notes are then presented for the student to learn at 970. At 975, the lower C note is introduced and the student is requested to draw several examples of whole, half and quarter note signs representing the C note having varying durations on a note sheet. Then, at 980, the proportional interrelationship of whole, half, quarter, eighth and sixteenth notes is discussed and illustrated in a linear manner in FIG. 27. Introducing yet another rhythmic concept, in notation, a dot after a note is used as a notational short cut. Its value is one-half of the value of the note it follows and, therefore, varies depending upon the value of the note it follows. Thus, the value of the dot can easily be determined by using the Ratio of 2:1. The relationship between notes using this ratio in 4/4 meter is graphically and clearly demonstrated for the student in FIG. 28A. Another way to represent dotted notes is shown in FIG. 28B. Thus, a dotted whole note can be written as a whole note tied to a half note, a dotted half note as a half note tied to a quarter note, a dotted quarter note as a quarter note tied to an eighth note and a dotted eighth note as an eighth note tied to a sixteenth note. The mathematical, graphic, notational presentation of FIGS. 28A and 28B makes learning this concept more accessible to the student whereas less clear explanations have been offered previously. Pieces using lower C and previously learned notes are provided for the student to learn and practice at 990 followed by a checkup on all of the notes learned to date at 995. At 1000, the lower B note is introduced and the student is requested to draw several examples of whole, half and quarter note signs representing the B note having varying durations on a note sheet. Pieces using the lower B note, sixteenth notes and other previously learned notes are provided for the student to practice at 1005. The concept of octave intervals is presented at 1010. An octave interval occurs when there is a skip of six notes between two notes, when there is a skip of six keys between two keys or when there is a skip of six letter names between two letter names. The student must name notes in various examples of octaves and must write independently generated examples of octaves. Finally, the student is introduced at 1015 to the lower A note is requested to draw several examples of whole, half and quarter note signs representing the A note having varying durations on a note sheet. The process terminates with another checkup at 1020 in which the student identifies multiple intervals learned thus far as well as writing in complex counting symbols and learning to play these musical examples independently. With regard to the remaining notes/keys on the piano keyboard, most teachers will likely have begun somewhere during this whole process to introduce their students to standard repertoire by well-known composers. Eventually, in their progress, students will encounter the remainder of the notes/keys, albeit in many cases, much less frequently than the ones presented in this method and more complex rhythms if they continue to study. By means of the concepts presented in this method, the student's continued learning is made easier and more logical for those who advance beyond the level of this method.

The instructional method of this invention provides a complete alphabetical approach which means "alphabetically" on the keyboard, "alphabetically" on the staff, and alphabetically in the learning of new notes and is, therefore, logical and fluid in presentation. Students learn to think in an orderly way and very early on can easily anticipate the names of additional notes on the staff. In other methods, students may play in the C position for some period and then switch to some other place on the keyboard which can seem like moving from one house to an unfamiliar one where nothing or little is the same. By contrast, in the alphabetical approach, notes/keys are simply added on to that which is already known in a manner similar to making an addition to an already occupied house. Students learn to write and therefore think carefully about note placement on the staff from the beginning. Students, therefore, become aware that notes "own" specific lines or spaces or that the specific line or space is the "address" for that particular note (and key) and no other and that the letter name of the note on the staff can only be known by checking the Clef used. Reading of notes becomes a positive experience rather than a stressful one. In addition, by virtue of using one set of fingers to play a piece and then changing to another set, students actually become more careful and conscientious about fingering correctly. Also, they immediately recognize in this situation that they can only make progress by knowing the letter names of the notes as finger placements for playing the same note in the same piece changes with repetition of the piece in several of the earliest pieces of this method.

By having regular and specific rhythmic practice including the recitation of instructive phrases such as "half-note-two-counts" or "whole-note-four-counts," students become more conscientious about observing durations of notes. Also, repetition of these phrases creates a mentally "tape recorded" memory of note values.

After following the learning method of this invention, students will also have been exposed to notes outside the standard clefs, often identified as the lowest and highest A's on the keyboard or the lowest F and lowest G. Consequently, students will have no difficulty finding these notes on the keyboard and playing any notes at the extremities of the keyboard. Furthermore, students will be well-trained in reading notes and playing them without the impediment of rigid fingering associations. The process steps disclosed herein are not the only way in which the method of this invention can be implemented. Other embodiments and sequences of steps are possible so long as the overall method and advantages described above are preserved.

What is claimed is:

1. A method for teaching one or more students rhythm and how to read and play music on a piano keyboard having both black and white keys while precluding rigid associations by each student between specific fingers and specific notes and/or keys comprising:
   performing preparatory activities;
   introducing rhythm and pulse;
   playing notes;
   introducing a Grand Staff;
   introducing a first middle set of notes and keys extending from A to G and including middle C individually in alphabetical sequence as they appear on said Grand Staff;
   introducing a second higher set of notes and keys extending from A to G adjacent to and higher than said first set of notes and keys individually in alphabetical sequence as they appear on said Grand Staff; and
   introducing a third lower set of notes and keys extending from G to A adjacent to and lower than said first set of notes and keys individually in reverse alphabetical sequence as they appear on said Grand Staff;
   wherein students identify both keys and notes before reading and playing musical pieces using those keys and notes and, after keys and notes have been introduced, students further play musical pieces incorporating those keys and notes together with previously introduced keys and notes and increasingly complex rhythmic concepts and each student plays using varying fingering for each said piece.

2. The method of claim 1 wherein the rhythmic concepts introduced comprise:
   replicating multiple conducting patterns;
   rhythmic practices using spoken identification of notes wherein the speech replicates the duration of the note and is accompanied by tapping; and the incorporation of geometric shapes and proportional visual graphics to represent said rhythmic concepts.

3. The method of claim 1 wherein introducing rhythm and pulse comprises speaking quarter, half and whole notes in a speech pattern replicating the rhythm, pulse and duration of each said note.

4. The method of claim 1 wherein playing comprises:
initially playing only individual black keys of the piano keyboard from low to higher notes alternating between the left hand for groups of three black notes and the right hand for groups of two black notes;
playing two black notes simultaneously alternating between the left and the right hand;
playing non-staff musical pieces in which fingering for each note is indicated and either the left hand crosses the right hand during playing or the right hand plays in two locations while the left hand plays in only one location.

5. The method of claim 1 wherein performing further comprises:
addressing ergonomic issues;
replicating a conducting pattern representing a four count meter;
numbering the fingers of both hands of each student;
introducing the piano keyboard to each student;
learning and reciting the musical alphabet forward and backward;
locating all D keys on the keyboard; and
naming all white keys on the keyboard from left to right.

6. The method of claim 1 wherein introducing a first middle set further comprises:
working with an illustration of a partial piano keyboard and Grand Staff which depicts and identifies the keys of said first middle set interconnecting each of those keys with quarter notes on a Grand Staff each representing the respective key;
individually and sequentially locating the A, B and C notes of the middle set on the Bass Clef of a Grand Staff and drawing examples on a blank Bass Clef or Treble Clef, where possible, of whole, half and quarter notes for each said note;
reading notes appearing in musical pieces aloud optionally in rhythm;
tapping rhythm for notes read aloud;
playing the same, specified musical piece repetitively using different fingering positions when playing the same note in one or more repetitions;
conducting a three beat meter;
performing a first checkup drill;
individually and sequentially locating the D note of the middle set on the Treble Clef of a Grand Staff and drawing examples on a blank Treble Clef of whole, half and quarter D notes;
learning pieces in 3/4 and 4/4 meter incorporating all previously located notes and varied fingering;
learning the concept of intervals of seconds;
individually and sequentially locating the E note of the middle set on the Treble Clef of a Grand Staff and drawing examples on a blank Treble Clef of whole, half and quarter E notes;
learning pieces in 3/4 and 4/4 meter incorporating all previously located notes and varied fingering;
performing a second checkup drill;
individually and sequentially locating the F note of the middle set on the Treble Clef of a Grand Staff and drawing examples on a blank Treble Clef of whole, half and quarter F notes;
learning pieces with varied fingering incorporating all previously located notes;
individually and sequentially locating the G note of the middle set on the Treble Clef of a Grand Staff and drawing examples on a blank Treble Clef of whole, half and quarter G notes;
learning pieces with varied fingering incorporating all previously located notes;
performing a third checkup drill;
learning the concept of intervals of thirds;
performing rhythmic practice;
performing a fourth checkup drill;
learning the concept of intervals of fourths;
performing a fifth checkup drill; and
identifying keys in reverse order from higher to lower on the keyboard.

7. The method of claim 1 wherein introducing a second higher set further comprises:
working with an illustration of a partial piano keyboard and Grand Staff which depicts and identifies the keys of said first middle set interconnecting each of those keys with quarter notes on a Grand Staff each representing the respective key and the keys of said second higher set interconnecting each of those keys with half notes on a Grand Staff each representing the respective key;
individually and sequentially locating the A, B and C notes of said second higher set on the Treble Clef of a Grand Staff and drawing examples on a blank Treble Clef of whole, half and quarter notes for each said note;
learning the concept of intervals of fifths;
learning pieces with varied fingering incorporating all previously located notes;
individually and sequentially locating the D note of said second higher set on the Treble Clef of a Grand Staff and drawing examples on a blank Treble Clef of whole, half and quarter D notes;
learning the concept of intervals of sixths;
performing a sixth checkup drill;
individually and sequentially locating the E note of said second higher set on the Treble Clef of a Grand Staff and drawing examples on a blank Treble Clef of whole, half and quarter E notes;
learning pieces with varied fingering incorporating all previously located notes;
individually and sequentially locating the F note of said second higher set on the Treble Clef of a Grand Staff and drawing examples on a blank Treble Clef of whole, half and quarter F notes;
learning pieces with varied fingering incorporating all previously located notes;
introducing dotted quarter notes;
performing a seventh checkup drill;
individually and sequentially locating the G note of said second higher set on the Treble Clef of a Grand Staff and drawing examples on a blank Treble Clef of whole, half and quarter G notes;
replicating conducting patterns representing a 5/4 meter;
learning pieces with varied fingering incorporating all previously located notes; and
performing an eighth checkup drill.

8. The method of claim 1 wherein introducing a third lower set further comprises:
working with an illustration of a partial piano keyboard and Grand Staff which depicts and identifies the keys of said first middle set interconnecting each of those keys with quarter notes on a Grand Staff each representing the respective key, the keys of said second higher set interconnecting each of those keys with half notes on a Grand Staff each representing the respective key and the keys of said third lower set interconnecting each of those keys with whole notes on a Grand Staff each representing the respective key;

individually and sequentially locating the G note of said third lower set on the Bass Clef of a Grand Staff and drawing examples on a blank Bass Clef of whole, half and quarter notes for said note;

introducing the key signature concept;

introducing the concept of eighth notes;

individually and sequentially locating the F note of said third lower set on the Bass Clef of a Grand Staff and drawing examples on a blank Bass Clef of whole, half and quarter F notes;

learning pieces with varied fingering incorporating all previously located notes;

learning the concept of intervals of sevenths;

performing a ninth checkup drill;

introducing the concept of three against two;

individually and sequentially locating the E note of said third lower set on the Bass Clef of a Grand Staff and drawing examples on a blank Bass Clef of whole, half and quarter E notes;

learning pieces with varied fingering incorporating all previously located notes;

performing a tenth checkup drill;

individually and sequentially locating the D note of said third lower set on the Bass Clef of a Grand Staff and drawing examples on a blank Bass Clef of whole, half and quarter D notes;

introducing sixteenth notes;

learning pieces with varied fingering incorporating all previously located notes;

individually and sequentially locating the C note of said third lower set on the Bass Clef of a Grand Staff and drawing examples on a blank Bass Clef of whole, half and quarter C notes;

showing the proportional interrelationship of notes;

discussing the dotted note concept;

learning pieces with varied fingering incorporating all previously located notes;

performing an eleventh checkup drill;

individually and sequentially locating the B note of said third lower set on the Bass Clef of a Grand Staff and drawing examples on a blank Bass Clef of whole, half and quarter B notes;

learning pieces with varied fingering incorporating all previously located notes;

introducing the concept of octaves;

individually and sequentially locating the A note of said third lower set on the Bass Clef of a Grand Staff and drawing examples on a blank Bass Clef of whole, half and quarter A notes; and performing a twelfth checkup drill.

* * * * *